United States Patent [19]
Ichimura et al.

[11] Patent Number: 6,078,969
[45] Date of Patent: Jun. 20, 2000

[54] INFORMATION PROCESSING DEVICE AND METHOD FOR SEQUENCE CONTROL AND DATA PROCESSING

[75] Inventors: Katsuhiko Ichimura; Takeshi Nakata; Goro Fukutome, all of Kyoto, Japan

[73] Assignee: OMRON Corporation, Kyoto, Japan

[21] Appl. No.: 08/836,474

[22] PCT Filed: Sep. 26, 1996

[86] PCT No.: PCT/JP96/02782

§ 371 Date: May 20, 1997

§ 102(e) Date: May 20, 1997

[87] PCT Pub. No.: WO97/12304

PCT Pub. Date: Apr. 3, 1997

[30] Foreign Application Priority Data

Sep. 26, 1995 [JP] Japan ................................. 7-247516
Sep. 28, 1995 [JP] Japan ................................. 7-250913

[51] Int. Cl.[7] ............................................. G06F 9/30
[52] U.S. Cl. ............................... 710/6; 710/48; 710/260
[58] Field of Search .................................. 395/868, 733, 395/200.34; 710/6, 260, 48; 709/204

[56] References Cited

U.S. PATENT DOCUMENTS

| | | | |
|---|---|---|---|
| 3,713,107 | 1/1973 | Barsamian | 340/172.5 |
| 4,302,820 | 11/1981 | Struger et al. | 364/900 |
| 4,870,614 | 9/1989 | Quatse | 364/900 |
| 4,901,232 | 2/1990 | Harrington et al. | 710/6 |
| 4,920,481 | 4/1990 | Binkley et al. | 364/200 |
| 5,225,975 | 7/1993 | Gates et al. | 364/147 |
| 5,371,860 | 12/1994 | Mura et al. | 395/325 |

FOREIGN PATENT DOCUMENTS

| | | |
|---|---|---|
| 0 351 882 | 1/1990 | European Pat. Off. . |
| 0 473 866 A2 | 3/1992 | European Pat. Off. . |
| 0 586 813 A2 | 3/1994 | European Pat. Off. . |
| 0 647 891 A2 | 4/1995 | European Pat. Off. . |
| 3808135 A1 | 9/1989 | Germany . |
| 2-32405 | 2/1990 | Japan . |
| 2-141806 | 5/1990 | Japan . |
| 3-288906 | 12/1991 | Japan . |

*Primary Examiner*—Thomas C. Lee
*Assistant Examiner*—Albert Wang
*Attorney, Agent, or Firm*—Foley & Lardner

[57] ABSTRACT

An information processing device includes a general-purpose personal computer 200, and a sequence engine 300 having a rudder interpreter 301 connected to the general-purpose personal computer 200 through a personal computer expansion bus 500. The rudder interpreter 301 executes a sequence instruction based on a predetermined sequence program in accordance with an instruction sent from the general-purpose personal computer 200. The general-purpose personal computer 200 performs information processing based on a predetermined information processing program, and executes peripheral processing in accordance with a peripheral processing request sent from the rudder interpreter 301.

28 Claims, 16 Drawing Sheets

PROGRAM COUNTER REGISTER FOR INFORMATION PROCESSING

INITIAL VALUE : 00000000h

DATA ADDRESS REGISTER

INITIAL VALUE : 00000000h

DATA SIZE REGISTER

INITIAL VALUE : 0000h (RESERVE IS 0)

even. 6,078,969

INFORMATION PROCESSING DEVICE AND METHOD FOR SEQUENCE CONTROL AND DATA PROCESSING

TECHNICAL FIELD

The present invention relates to an information processing device and an information processing method for performing sequence processing such as programmable logic controller (which will be referred to as "PLC" hereinafter) as well as information processing, and in particular relates to a device and a method for information processing, which allow inexpensive construction of a whole system using a general-purpose computer, and also allow information processing with a minimum influence exerted on a cycle of the sequence processing.

BACKGROUND ART

Such information processing devices have recently been proposed that perform sequence processing of a PLC or the like utilizing a general-purpose personal computer, and also perform information processing. These information processing devices utilizing general-purpose personal computers can be classified into the followings:

(1) A type in which a PLC board is connected to a slot of a general-purpose computer (which will be referred to as a "board PLC").

(2) A type in which a general-purpose personal computer is added to a PLC (which will be referred to as a "PLC+personal computer"), and (3) A type in which an intended function is provided by software on a general-purpose personal computer (which will be referred to as a "software PLC").

FIG. 16 is a block diagram showing a schematic structure of the board PLC. Board PLC 15 has a structure in which a PLC board 20 is connected to a slot of a general-purpose personal computer 10 (which will be simply referred to as a "personal computer" hereinafter) through a personal computer expansion bus 30.

Personal computer 10 includes a microprocessor unit (MPU1) 11 and a work memory 12.

PLC board 20 includes a ladder interpreter 21, a memory 22, a microprocessor unit (MPU2) 23, a read-only memory (ROM) 24 and a buffer 25.

Memory 22 includes a user memory UM for storing a ladder program which is a user program, and an input/output memory IOM for storing input/output information.

In the above structure, ladder interpreter 21 has a function as a bus controller, so that microprocessor unit (MPU1) 11 of personal computer 10 can access memory 22 of PLC board 20 through personal computer expansion bus 30. ladder interpreter 21 can access work memory 12 of personal computer 10 through personal computer expansion bus 30.

The processing of PLC can be basically classified into two kinds of processing, i.e., "instruction execution" for interpreting and executing a ladder program and "peripheral processing" for performing input refreshing (IN-refreshing) and output refreshing (OUT-refreshing) of an input/output port (I/O) and others.

In the board PLC shown in FIG. 16, the ladder interpreter 21 fetches and decodes a ladder program stored in user memory UM of memory 22 for the above "instruction execution".

Read-only memory (ROM) 24 in PLC board 20 has stored a peripheral processing program for the foregoing "peripheral processing". Microprocessor unit (MPU2) 23 executes the "peripheral processing" using the peripheral processing program stored in read-only memory (ROM) 24.

In the foregoing structure, personal computer 10 uses work memory 12 for executing predetermined information processing.

The "PLC+personal computer" described above differs from the above board PLC in that the PLC is not formed of a PLC board structure, and is basically the same as the PLC board.

FIG. 17 shows steps of processing by the above PLC and "PLC+personal computer". Although FIG. 17 shows the steps of processing by the board PLC shown in FIG. 16, steps of processing by the "PLC+personal computer" are performed similarly to those shown in FIG. 17.

In FIG. 17, ladder interpreter 21 of PLC board 20 first fetches and decodes a ladder program stored in user memory UM of memory 22 in PLC board 20 for performing "instruction execution" (step S101). Results of this "instruction execution" are written into I/O memory IOM, and thereby the results of the "instruction execution" are reflected on I/O memory IOM of memory 22 of PLC board 20. When one "instruction execution" is completed, a request for "peripheral processing" is sent to microprocessor unit (MPU2) 23 of PLC board 20, and microprocessor unit (MPU2) 23 of PLC board 20 performs "peripheral processing" based on a peripheral processing program stored in read-only memory (ROM) 24 (step S102).

Thereafter, personal computer 10 reads out contents of I/O memory IOM for matching data held in personal computer 10 with data held in PLC board 20 (i.e., data held in memory 22 of PLC board 20), and "data exchange" is performed between personal computer 10 and PLC board 20 (step S103).

Thereafter, the device operates similarly, and more specifically performs "instruction execution" by ladder interpreter 21 (step S104), "peripheral processing" by microprocessor unit (MPU2) 23 (step S105), "instruction execution" by ladder interpreter 21 (step S106), "peripheral processing" by microprocessor unit (MPU2) 23 (step S107), "data exchange" between personal computer 10 and PLC board 20 (step S108), "instruction execution" by ladder interpreter 21 (step S109), and "peripheral processing" by microprocessor unit (MPU2) 23 (step S110).

Personal computer 10 performs predetermined "information processing" while "data exchange" is not being performed between personal computer 10 and PLC board 20 of personal computer 10 (steps S112 and S113).

The board PLC and the "PLC+personal computer" are designed to operate as follows. Microprocessor unit (MPU1) 11 of personal computer 10 performing information processing is notified that "data exchange" is allowed every time PLC board 20 or the unillustrated PLC completes one cycle of sequence control formed of "instruction execution" and "peripheral processing". At this time, if microprocessor unit (MPU1) 11 of personal computer 10 has already completed one cycle of "information processing", "data exchange" is performed. If microprocessor unit (MPU1) 11 of personal computer 10 has not yet completed one cycle of "information processing", "data exchange" is not performed, and microprocessor unit (MPU1) 11 of personal computer 10 continues "information processing". Thus, in the board PLC and the "PLC+personal computer", "information processing" by microprocessor unit (MPU1) 11 or personal computer 10 is performed in such a manner that "data exchange" between personal computer 10 and PLC board 20 is not performed during one cycle of "information processing" from start to completion of "information processing".

FIG. 18 shows steps of processing by the foregoing software PLC. In this software PLC, the "instruction execution", "peripheral processing" and "information processing" are performed only by personal computer 10 shown in FIG. 16.

First, microprocessor unit (MPU1) 11 of personal computer 10 fetches and decodes a ladder program stored in user memory UM to perform "instruction execution" (step S121). Then, microprocessor unit (MPU1) 11 of personal computer 10 performs "peripheral processing" (step S122) and "data exchange" (step S124), and thereafter microprocessor unit (MPU1) 11 of personal computer 10 performs "information processing" (step S124).

Thereafter, the device operates similarly, and more specifically microprocessor unit (MPU1) 11 of personal computer 10 repeats "instruction execution" (step S125), "peripheral processing" (step S125), "data exchange" (step S127) and "information processing" (step S128).

In the above steps of processing by the software PLC, "information processing" is performed each time "sequence control" is performed several times in view of a volume of "information processing" and a period of "sequence control" formed of "instruction execution" and "peripheral processing".

FIG. 19 is a flow chart specifically showing steps of processing of the software PLC shown in FIG. 18. Referring to FIG. 19, upon start (step S161), power-on and, in particular, initial setting are performed (step S162), and then a ladder program stored in user memory UM is fetched and decoded (step S163) to perform "instruction execution" (step S164).

The results of execution are written into I/O memory IOM, so that the results of execution are reflected on I/O memory IOM (step S165).

Then, it is determined whether this "instruction execution" is completed or not (S166). If not (NO at step S166), the process returns to step S163, and processing from step S163 to step S166 is repeated. If it is determined that "instruction execution" is completed (YES at step S166), peripheral processing such as I/O refreshing is then executed (step S167).

It is determined whether the ladder program stored in user memory UM is entirely completed or not (step S168). If not (NO at step S168), the process returns to step S163. If it is determined that the ladder program is completed (YES at step S168), the process is completed (step S169).

FIG. 20 is a flow chart showing steps of processing by the personal computer in the board PLC, the "PLC+personal computer" and the software PLC. When the personal computer starts up (step S131), it is first determined whether a request for data exchange is present or not (step S132). If present (YES at step S132), "data exchange" is performed (step S133), and then "information processing" is executed (step S134). Then, it is determined whether "information processing" is completed or not (step S135). If not (NO at step S135), the process returns to step S134, and this "information processing" is continued. If it is determined that "information processing" is completed at step S135 (YES at step 135), it is then determined whether all the processing is completed or not (step S136). If not (NO at step S136), the process returns to step S132, and processing from step S132 to step 136 is repeated. If it is determined that all the processing is completed at step S136 (YES at step S136), this process is completed (step S137).

FIG. 21 specifically shows steps of processing in the board PLC and the "PLC+personal computer". With reference to FIG. 21, description will be given on the steps of processing by the board PLC shown in FIG. 16. However, the steps of processing by the "PLC+personal computer" are substantially the same as those shown in FIG. 21.

Referring to FIG. 21, upon start (step S141), microprocessor unit (MPU1) 11 of personal computer 10 as well as microprocessor unit (MPU2) 23 and ladder interpreter 21 of PLC board 20 are powered on, and initial setting of them is performed (step S142). Then, start-up of PLC is instructed (step S143), and thereby microprocessor unit (MPU2) 23 of PLC board 20 instructs start-up of ladder interpreter 21 Step S151).

Upon start-up of ladder interpreter 21 of PLC board 20 (step S152), ladder interpreter 21 performs "instruction execution" by fetching and decoding a ladder program stored in user memory UM of memory 22 in PLC board 20 Step S153). Results of this execution are written into I/O memory IOM of memory 22, so that the results of execution are reflected on I/O memory IOM.

Upon completion of one "instruction execution", ladder interpreter 21 sends a request for "peripheral processing" to microprocessor unit (MPU2) 23 of PLC board 20, and microprocessor unit (MPU2) 23 of PLC board 20 performs "peripheral processing" based on a peripheral processing program stored in read-only memory (ROM) 24 Step S154).

Microprocessor unit (MPU1) 11 of personal computer 10 instructs start-up of PLC at step S143, and then determines whether data requiring information processing is present or not Step S144). If data requesting information processing is present (YES at step S144), "information processing" is performed (step S145). When this "information processing" is completed, microprocessor unit (MPU2) 23 of PLC board 20 is notified that data exchange is being waited for (step S146).

When it is determined that no data requiring information processing is present at step S144 (NO at step S144), the process advances to step S146 without performing "information processing" at step S145, and the fact that data exchange is being waited for is notified to microprocessor unit (MPU2) 23 of PLC board 20.

When "peripheral processing" at step S154 is completed, microprocessor unit (MPU2) 23 of PLC board 20 determines whether microprocessor unit (MPU1) 11 of personal computer 10 has issued a notice of wait for data exchange (step S155). If not (NO at step S155), the process returns to step S153.

If it is determined that a notification of wait for data exchange is present at step S155 (YES at step S155), a notification that data exchange is allowed is sent to microprocessor unit (MPU1) 11 of personal computer 10 (step S156).

Microprocessor unit (MPU1) 11 of personal computer 10 determines whether or not microprocessor unit (MPU2) 23 of PLC board 20 has notified that data exchange is allowed, i.e., whether data exchange is allowed or not (step S147), after notifying microprocessor unit (MPU2) 23 of PLC board 20 that data exchange is being waited. If data exchange is not allowed (NO at step S147), the process returns to step S146.

If it is determined that data exchange is allowed at step S147 (YES at step S147), "data exchange" is performed between microprocessor unit (MPU1) 11 of personal computer 10 and microprocessor unit (MPU2) 23 of PLC board 20 (steps S148 and S157).

Microprocessor unit (MPU1) 11 of personal computer 10 then determines whether all "information processing" is completed or not (step S149). If all "information processing" is not completed (NO at step S149), the process returns to step S145, and processing from step S145 to step S149 is repeated. When it is determined that all "information processing" is completed at step S149 (YES at step S149), microprocessor unit (MPU1) 11 of personal computer 10 finishes the processing (step S150).

Microprocessor unit (MPU2) 23 of PLC board 20 determines whether all "sequence processing" is completed or not when "data exchange" is completed (step S158). If all "sequence processing" is not completed (NO at step S158), the process returns to step S153, and processing starting from step S153 are repeated. If it is determined that all "sequence processing" is completed at step S158 (YES at step S158), processing by microprocessor unit (MPU2) 23 of PLC board 20 is finished (step S159).

The board PLC, "PLC+personal computer" and software PLC described above require "data exchange" by reading out contents of I/O memory IOM by the personal computer. However, the determination whether "data exchange" by the personal computer is to be performed or not is made only when "information processing" by the personal computer is finished. Thus, according to the board PLC, "PLC+personal computer" and software PLC, the personal computer continues "information processing" until the end of "information processing", and determines whether "data exchange" is to be performed or not when "information processing" is completed.

According to the software PLC, "information processing" operation is performed only when a constant number of requests for data exchange are counted. In this case, the above constant number is utilized to adjust a ratio between times of "sequence control" and times of "information processing".

The board PLC and the "PLC+personal computer" must employ dedicated microprocessor units for performing the "instruction execution" and "peripheral processing" as well as memories for storing peripheral processing program, resulting in expensive structures.

According to the software PLC, a cycle of "sequence processing" and a cycle of "information processing" are successively performed, so that a long time is disadvantageously required before start of a subsequent cycle of "sequence control".

According to the software PLC, the user program is executed by fetching and decoding the ladder program stored in user memory UM, and thereby "instruction execution" reflecting results of the execution on I/O memory IOM is performed. After the ladder program stored in user memory UM is entirely executed, "peripheral processing" is performed, and specifically the state of each I/O port I/O is reflected on I/O memory IOM by I/O refreshing. Since the foregoing operations are performed as one cycle of the process, an execution speed is disadvantageously slow.

Accordingly, an object of the present invention is to provide an information processing device and an information processing method, which allow an inexpensive structure of a whole system, and can perform information processing with a minimized influence exerted on a cycle of sequence processing.

Another object of the invention is to provide a device and a method for sequence control, which allow an inexpensive structure of a whole system, and can increase an execution speed.

DISCLOSURE OF THE INVENTION

An information processing device according to the invention includes a data processing device provided with a processor and an internal bus connected to the processor, and a sequence instruction execution unit connected to the internal bus. In this information processing device, the data processing device or the sequence instruction execution unit includes a user memory for storing a sequence program prepared by a user and an I/O memory for storing a status of input/output. AN I/O board connected to an external device controlled by an instruction of the sequence program is connected independently of the sequence instruction execution unit to the internal bus.

Since the I/O board connected to the external device, which is controlled by the instruction of the sequence program prepared by the user, is connected independently of the sequence instruction execution unit to the internal bus, the system construction can be simplified. Further, no mutual interference occurs between the operation of the external device and the operation of the sequence instruction execution unit controlled by the instruction of the sequence program, so that information processing can be performed with a minimized influence exerted on the cycle of the sequence processing.

According to another aspect, an information processing device includes a data processing device provided with a processor and an internal bus connected to the processor, and a sequence instruction execution unit connected to the internal bus. The data processing device or the sequence instruction execution unit includes a user memory for storing a sequence program prepared by a user and an I/O memory for storing a state of input/output. The information processing device further includes an I/O board connected to the internal bus and having a memory, and is connected to an external device via the I/O board. The data processing device includes an execution processing unit for executing predetermined peripheral processing after interpretation and execution of an instruction in the user memory by the sequence instruction execution unit.

The I/O board having the memory and connected to the external device is connected independently of the sequence instruction execution unit to the internal bus, and the predetermined peripheral processing is executed after interpretation and execution of the instruction in the user memory by the sequence instruction execution unit. Therefore, transmission of data between the external device and the I/O memory or the like is independently performed after execution of the instruction in the user memory, so that the whole system can have an inexpensive structure, and an influence exerted on a cycle of sequence processing can be minimized.

Preferably, the sequence program is formed of a ladder program, and the sequence instruction execution unit includes a ladder interpreter performing instruction execution processing by interpreting and executing the ladder program.

More preferably, the sequence instruction execution unit includes a register for managing the instruction execution processing by the ladder interpreter.

Further preferably, the register includes a program counter register having a value to be initially set upon start-up of the ladder interpreter and incremented upon every execution of one instruction of the ladder program, a status register storing a status of execution of the ladder program by the ladder interpreter, and an address register storing a leading address of the ladder program executed by the ladder interpreter.

Further preferably, the status register stores a first flag indicating start and stop of the ladder interpreter, and a second flag indicating whether the data processing device is to be requested to perform instruction execution processing with the ladder program or not.

According to still another aspect, the invention provides a sequence control method including the step of connecting a sequence instruction execution unit to a data processing device through a bus, and storing a sequence program in a data processing device, wherein the sequence instruction execution unit includes the step of executing the sequence program by accessing through the bus the sequence program stored in the data processing device based on an instruction issued from the data processing device.

In the sequence control method, since the sequence instruction execution unit executes the sequence program stored in the data processing device based on the instruction sent from the data processing device, it is possible to provide the sequence control method, which can reduce a cost of the whole system and can increase the execution speed.

According to further another aspect of the invention, a sequence engine not having a function of executing peripheral processing includes a ladder interpreter connected to an internal bus of a data processing device and activated by the data processing device to interpret and execute a ladder instruction, and a register for managing and storing a status of execution of the ladder program by the ladder interpreter.

Since the register manages and stores the status of execution of the ladder program by the ladder interpreter which is started up by the data processing device to interpret and execute the ladder instruction, the status of execution of the ladder program can be reliably managed.

PREFERRED EMBODIMENTS FOR IMPLEMENTING THE INVENTION

The invention will be described below further in detail with reference to the drawings.

(1) First Embodiment

Figure 1:
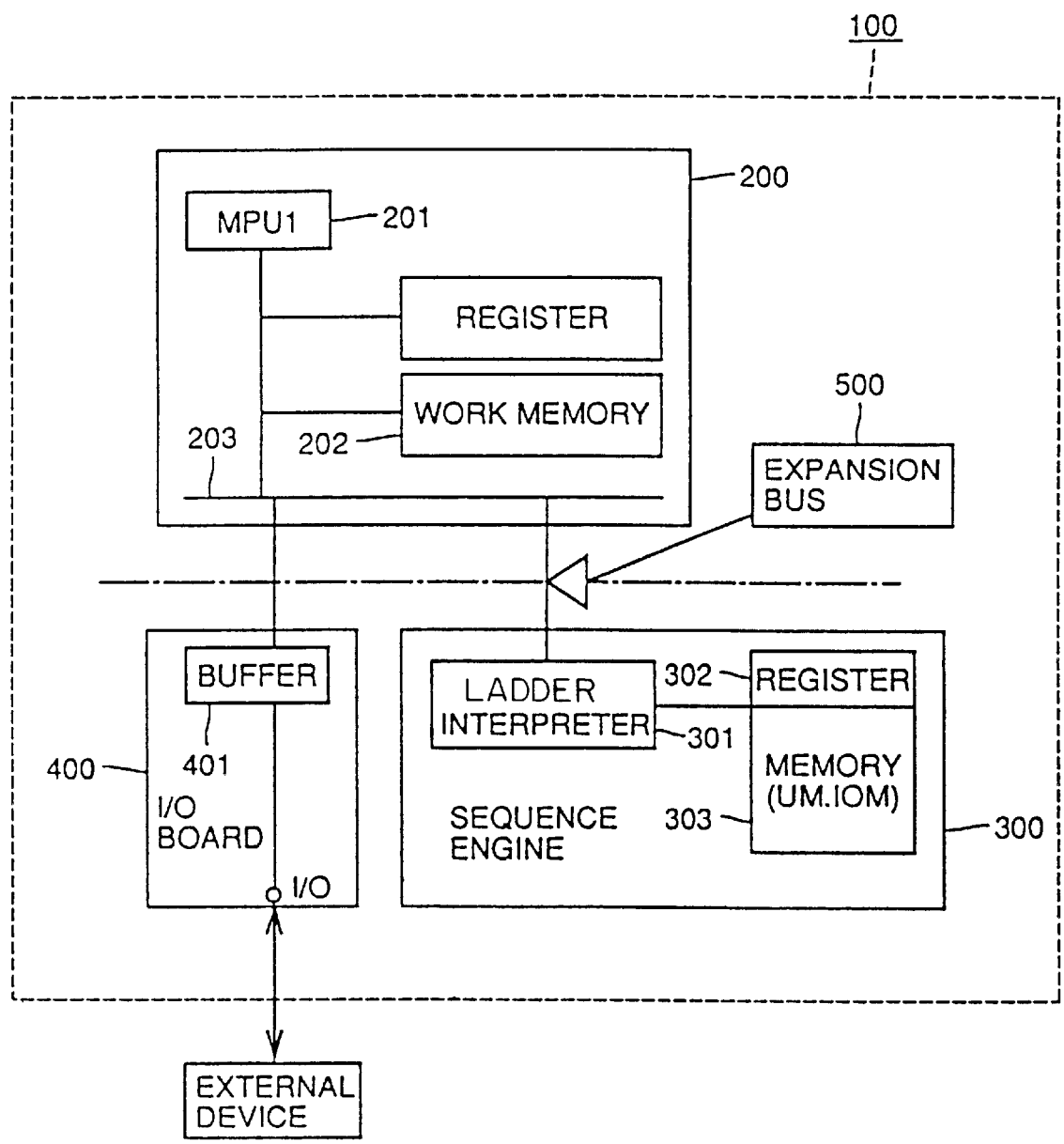
FIG. 1 is a block diagram showing a schematic structure of a software PLC with a sequence engine employing a device and a method for information processing according to a first embodiment of the invention.

Referring to FIG. 1, a software PLC 100 provided with a sequence engine, which is constructed by employing a device and a method for information processing according to the invention, has such a structure that a sequence engine 300 is connected to an internal bus 203 of a personal computer 200 through a personal computer expansion bus 500, and an input/output board (i.e., I/O board) 400 is connected to internal bus 203.

Personal computer 200 includes a microprocessor unit (MPU1) 201 and a work memory 202.

Sequence engine 300 includes a ladder interpreter 301 which interprets and executes a ladder program stored in a user memory UM, a register 302 which manages and stores a status of execution of the ladder program by ladder interpreter 301, and a memory 303 having a user memory UM storing the ladder program which is a user program and an I/O memory IOM storing input/output information.

Since ladder interpreter 301 has a function as a bus controller, microprocessor unit (MPU1) 201 of personal computer 200 can access register 302 and memory 303 of sequence engine 300 through personal computer expansion bus 500. Also, ladder interpreter 301 can access work memory 202 of personal computer 200 through personal computer expansion bus 500.

Input/output board (i.e., I/O board) 400 includes a buffer 401 which temporarily stores information sent into and from an input/output port (i.e., I/O port).

As already described, processing of the PLC can be basically classified into "instruction execution" for interpreting and executing the ladder program and "peripheral processing" for performing input refreshing (which will be referred to as "IN-refreshing" hereinafter) and output refreshing (which will be referred to as "OUT-refreshing" hereinafter) of the I/O port.

Here, "peripheral processing" includes processing for storing data, which was sent from an external device and is stored in buffer 401 of I/O board 400, in I/O memory IOM, and for sending data stored in the I/O memory IOM to the external device through buffer 401.

In software PLC 100 with the sequence engine shown in FIG. 1 of this embodiment, ladder interpreter 301 of sequence engine 300 performs the above "instruction execution" by fetching and decoding the ladder program stored in user memory UM of memory 303, and results of the "instruction execution" are reflected on I/O memory IOM of memory 303.

Microprocessor unit (MPU1) 201 of personal computer 200 performs "data exchange" by accessing I/O memory IOM of memory 303 through ladder interpreter 301 of sequence engine 300, and performs "information processing" based on a predetermined information processing program.

Figure 16:
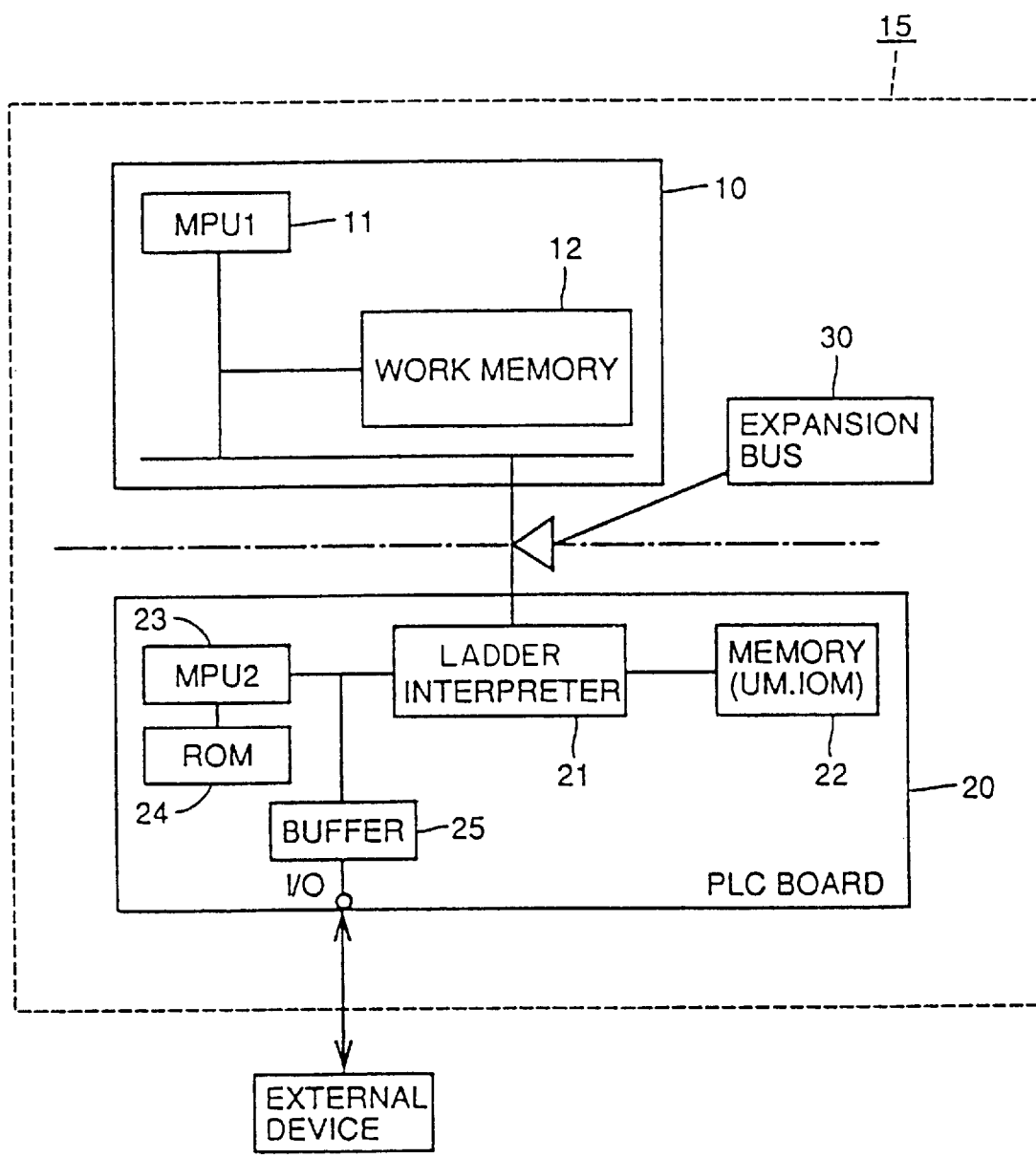
FIG. 16 is a block diagram showing a schematic structure of a board PLC in the prior art.
Figure 17:
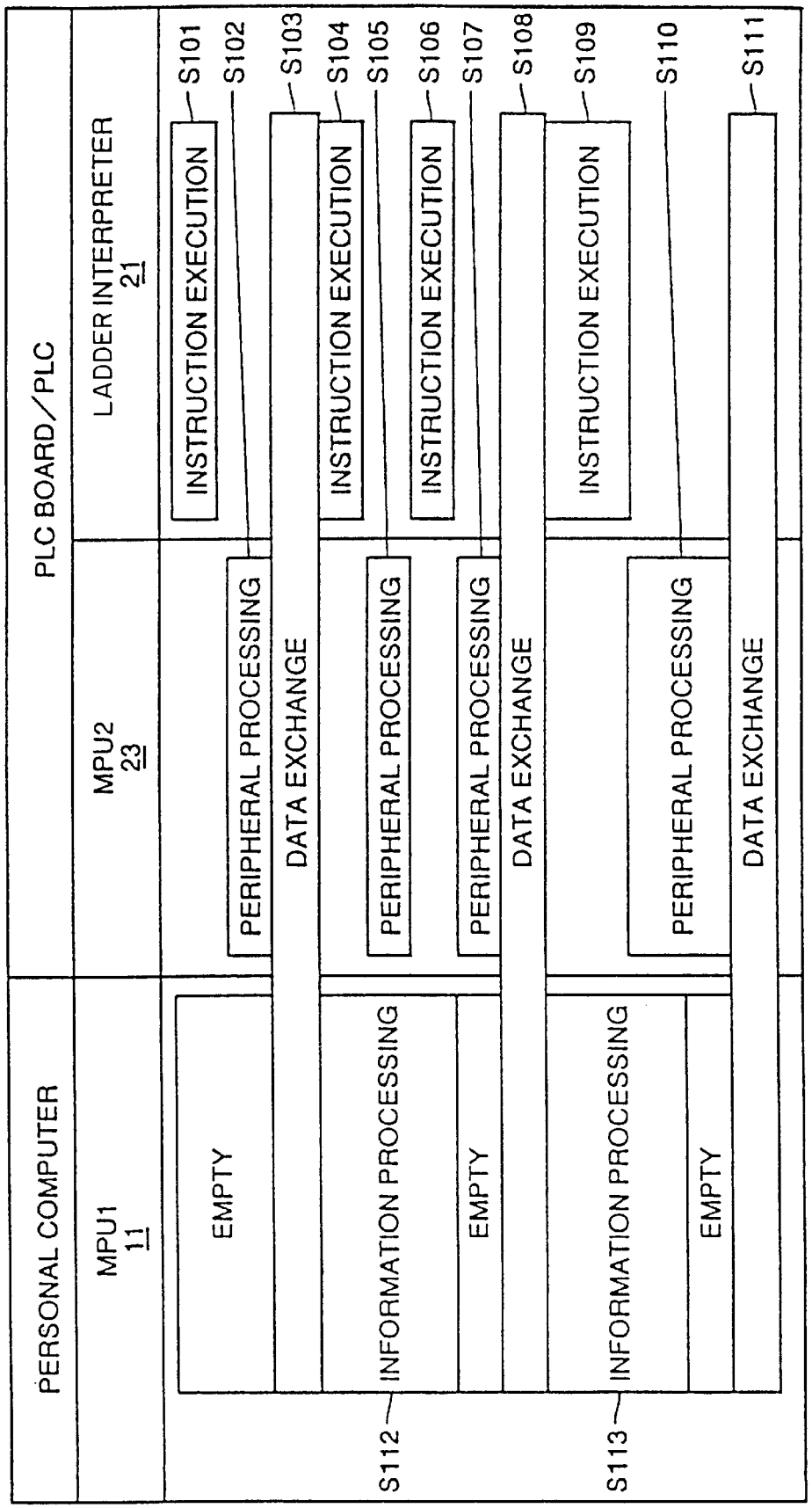
FIG. 17 shows steps of processing by the board PLC and "PLC+personal computer"
Figure 18:
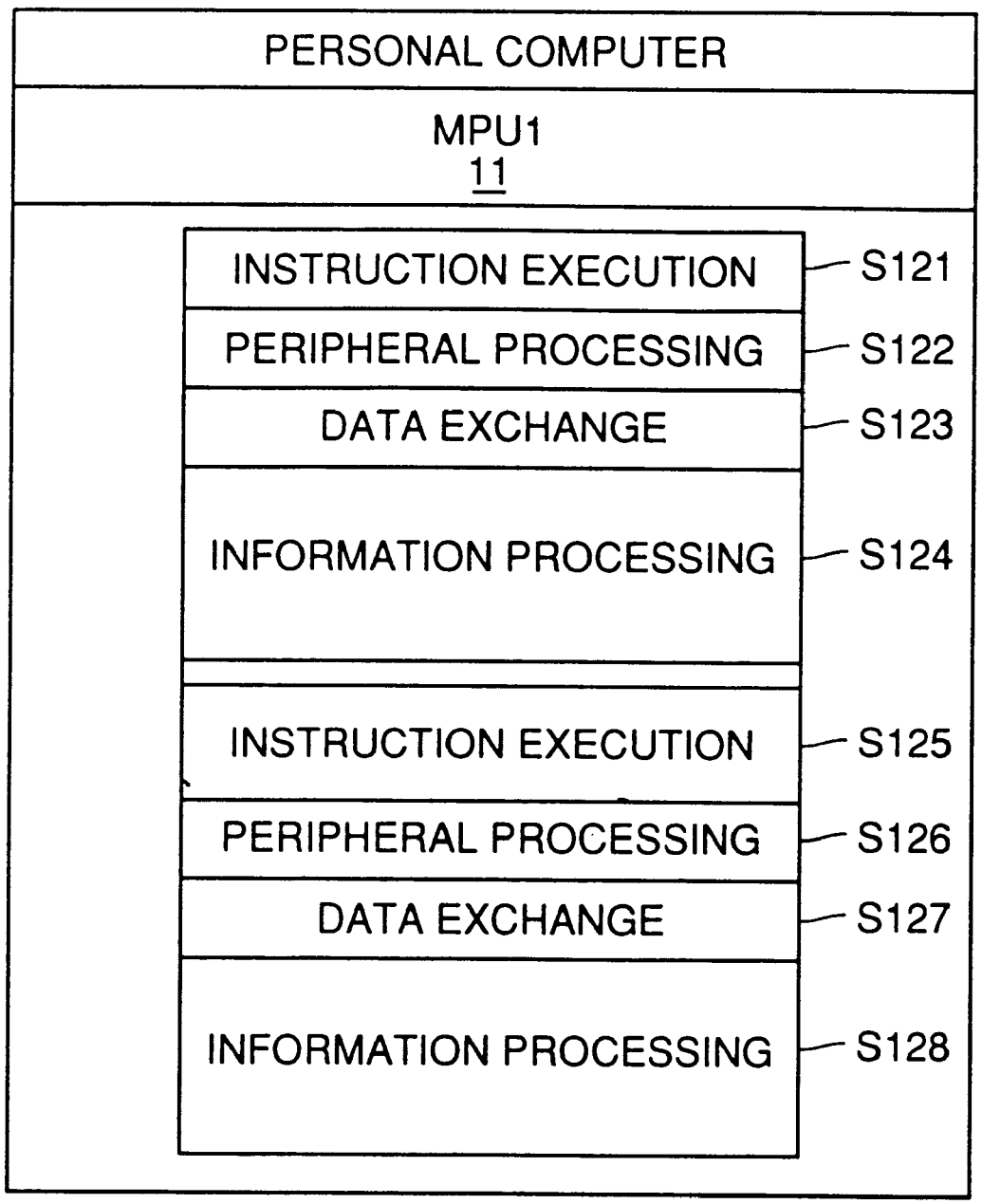
FIG. 18 shows steps of processing by a software PLC.
Figure 19:
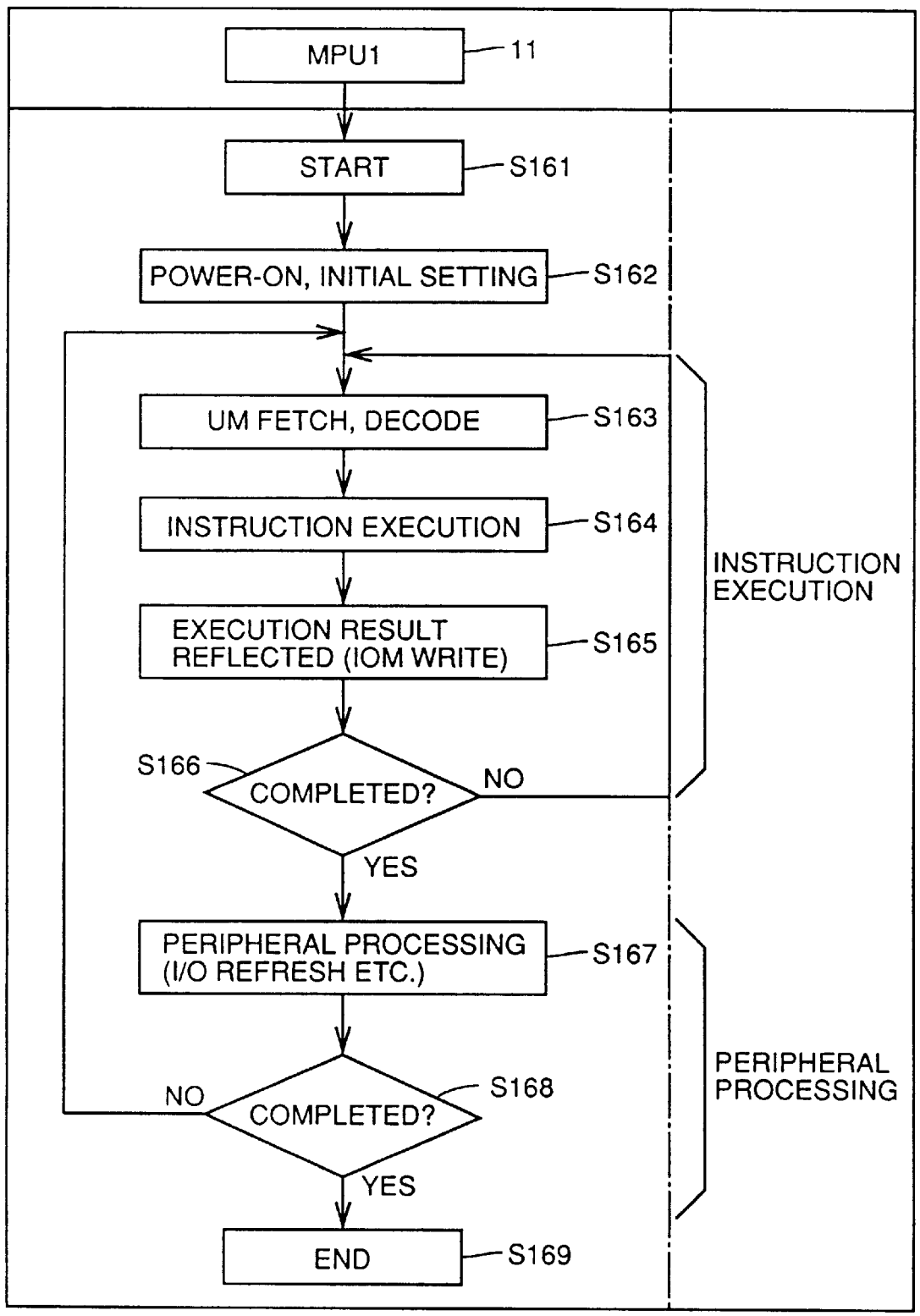
FIG. 19 is a flow chart specifically showing steps of processing by the software PLC.

According to the above structure, it is not necessary to provide a dedicated microprocessor unit and a dedicated memory at sequence engine 300, so that the structure can be significantly inexpensive compared with board PLC 15 shown in FIG. 16. Further, "instruction execution" is performed by dedicated hardware, i.e., ladder interpreter 301 of sequence engine 300, so that processing can be faster than that by the software PLC already described with reference to FIG. 18.

In this embodiment, a predetermined information processing program executed by microprocessor unit (MPU1) 201 of personal computer 200 is formed of a plurality of blocks, and, upon every completion of processing of one block, microprocessor unit (MPU1) 201 of personal computer 200 determines whether a predetermined processing request issued from sequence engine 300 is present or not.

Therefore, microprocessor unit (MPU1) 201 of personal computer 200 is designed such that, even during information processing, it can interrupt "information processing" and can execute "peripheral processing" whenever sequence engine 300 issues a request for peripheral processing.

In this embodiment, therefore, the internal status is saved in the register upon every interruption of "information processing". When "information processing" is restarted after completion of "peripheral processing", the internal status saved in the register is read out for restarting "information processing".

Figure 2:
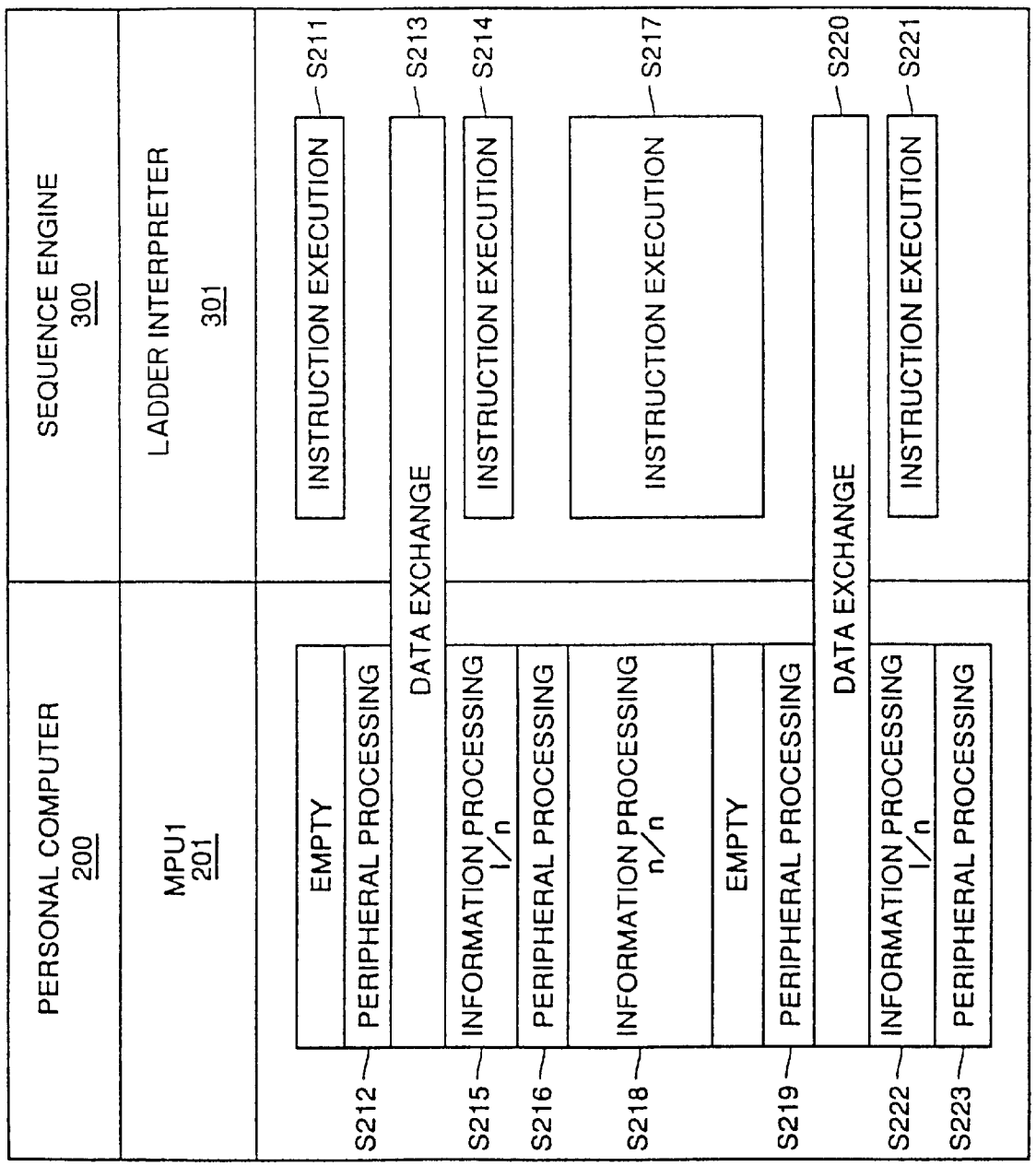
FIG. 2 shows steps of processing in the software PLC with the sequence engine shown in FIG. 1.

FIG. 2 shows steps of processing in software PLC 100 with the sequence engine shown in FIG. 1. Referring to FIG. 2, ladder interpreter 301 of sequence engine 300 first performs "instruction execution" by fetching and decoding the ladder program stored in user memory UM of memory 303 (step S211).

When ladder interpreter 301 of sequence engine 300 finishes this "instruction execution", ladder interpreter 301 of sequence engine 300 sends a "peripheral processing request" to microprocessor unit (MPU1) 201 of personal computer 200.

Microprocessor unit (MPU1) 201 of personal computer 200, which received the "peripheral processing request" from ladder interpreter 301 of sequence engine 300, executes "peripheral processing" (step S212). When this "peripheral processing" is finished, microprocessor unit (MPU1) 201 accesses I/O memory IOM of memory 303 of sequence engine 300 and performs "data exchange", i.e., reading of data from I/O memory IOM (step S213). Thereafter, "information processing" is executed (step S215). The information processing program of "information processing" executed by microprocessor unit (MPU1) 201 of personal computer 200 is formed of a plurality of (e.g., n) divided blocks. Microprocessor unit (MPU1) 201 of personal computer 200 first executes a first block of the information processing program, i.e., 1/n of the information processing program.

In ladder interpreter 301 of sequence engine 300, a next instruction in the ladder program stored in user memory UM of memory 303 is fetched and decoded to perform "instruction execution" when "data exchange" is completed (step S214).

When this "instruction execution" is completed, the "peripheral processing request" is sent to microprocessor unit (MPU1) 201 of personal computer 200.

In microprocessor unit (MPU1) 201 of personal computer 200, when execution of the first block, i.e., 1/n of the information processing program is completed (step S215), predetermined "interruption processing" is executed, and it is determined whether ladder interpreter 301 of sequence engine 300 has issued a "peripheral processing request" or not.

In this case, since it is determined that ladder interpreter 301 of sequence engine 300 has issued the "peripheral processing request", "information processing" which is being performed is interrupted, and the "peripheral processing" is executed (step S216).

Thereafter, processing is performed in a similar manner, and more specifically, the device performs "instruction execution" by ladder interpreter 301 of sequence engine 300 (step S217), "information processing" by microprocessor unit (MPU1) 201 of personal computer 200 (step S218), "peripheral processing" (step S219), "data exchange" (step S220), "instruction execution" by ladder interpreter 301 of sequence engine 300 (step S221), "information processing" by microprocessor unit (MPU1) 201 of personal computer 200 (step S222), and "peripheral processing" by microprocessor unit (MPU1) 201 of personal computer 200 (step S223).

According to the above structure, microprocessor unit (MPU1) 201 of personal computer 200 determines whether sequence engine 300 has issued a "peripheral processing request" or not upon every completion of processing of one block. When the "peripheral processing request" has been issued, "information processing" is interrupted and "peripheral processing" is executed. Therefore, "information processing" can be performed with a minimum influence exerted on a cycle of "sequence processing" performed by ladder interpreter 301 of sequence engine 300.

Figure 3:
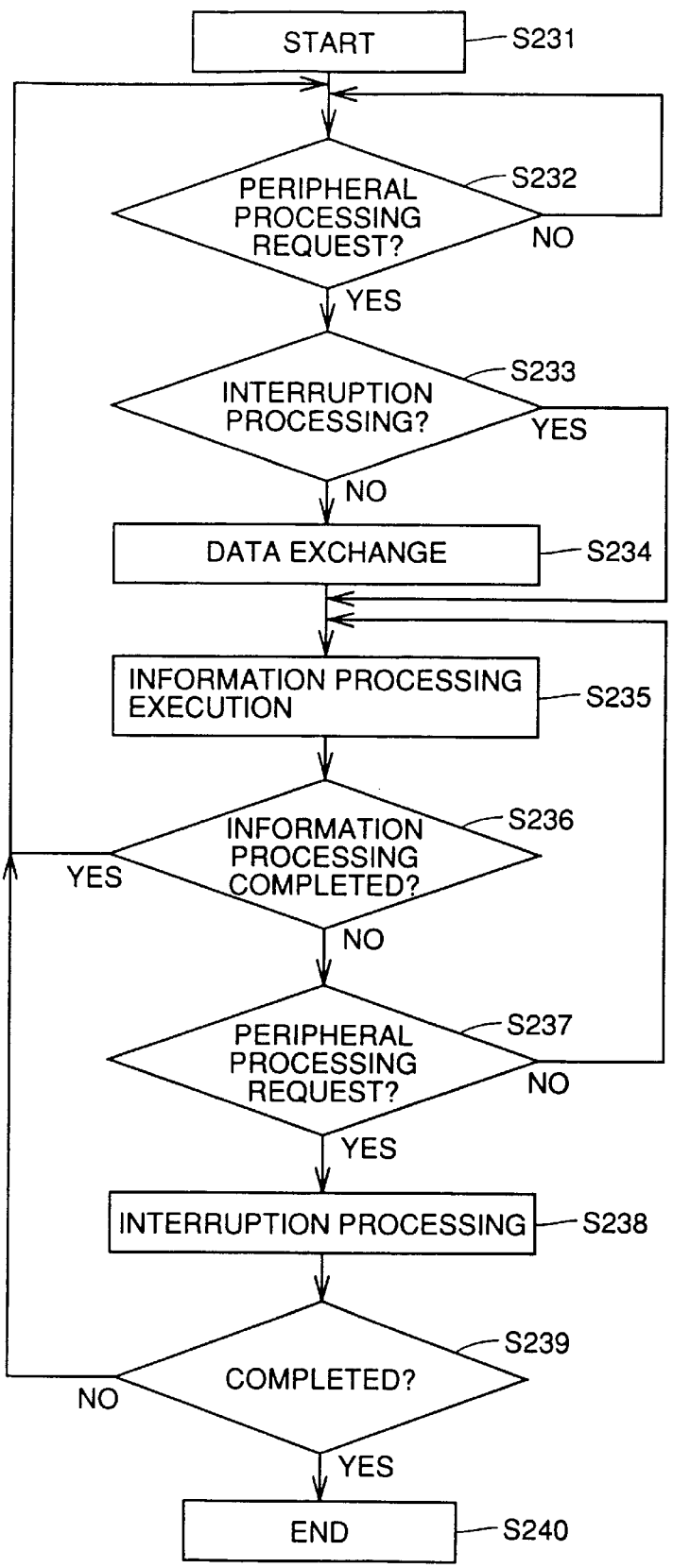
FIG. 3 is a flow chart showing steps of information processing by a microprocessor unit of a personal computer shown in FIG. 1.
Figure 20:
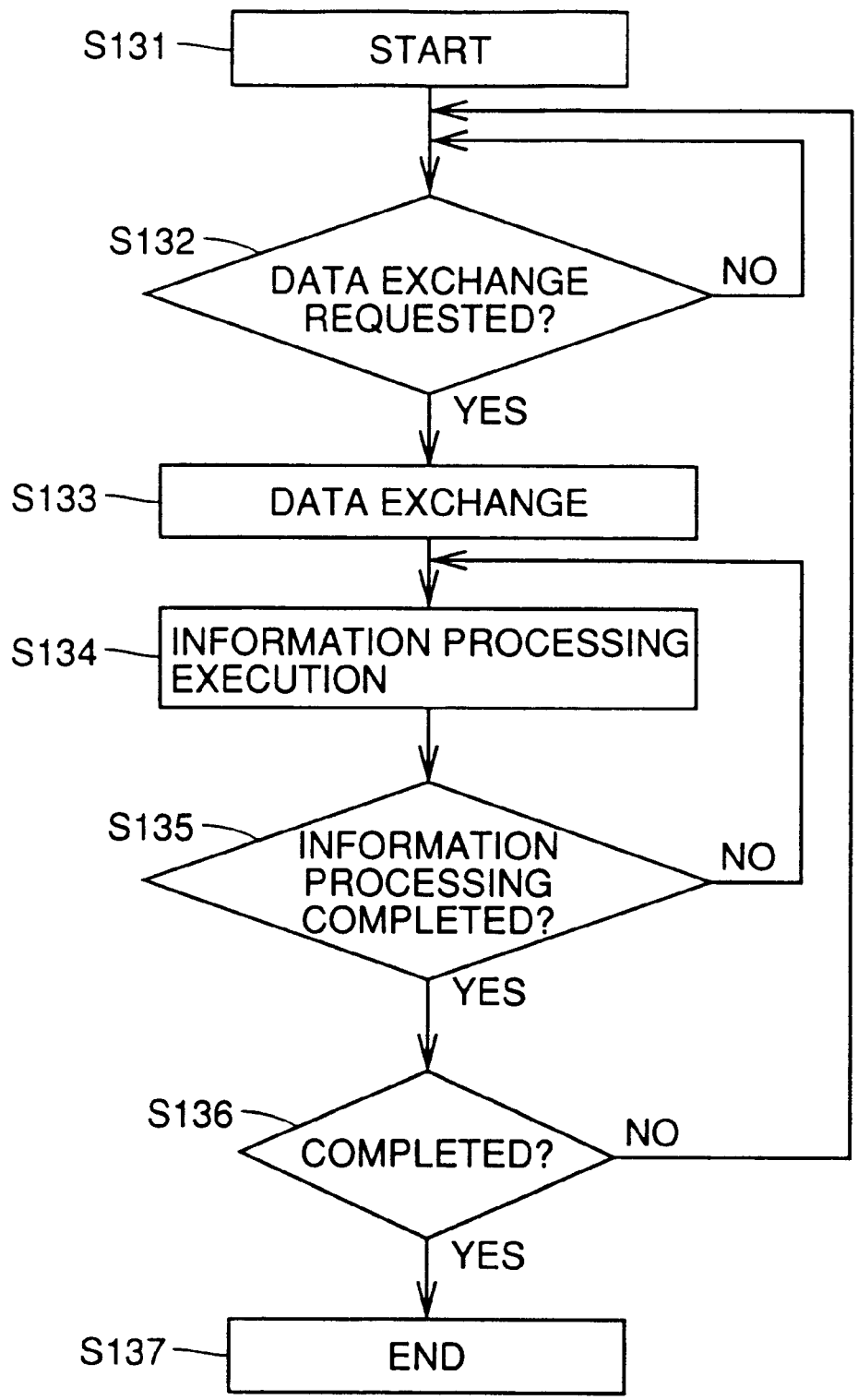
FIG. 20 is a flow chart showing steps of information processing by a personal computer in the board PLC, "PLC+personal computer" and software PLC.
Figure 21:
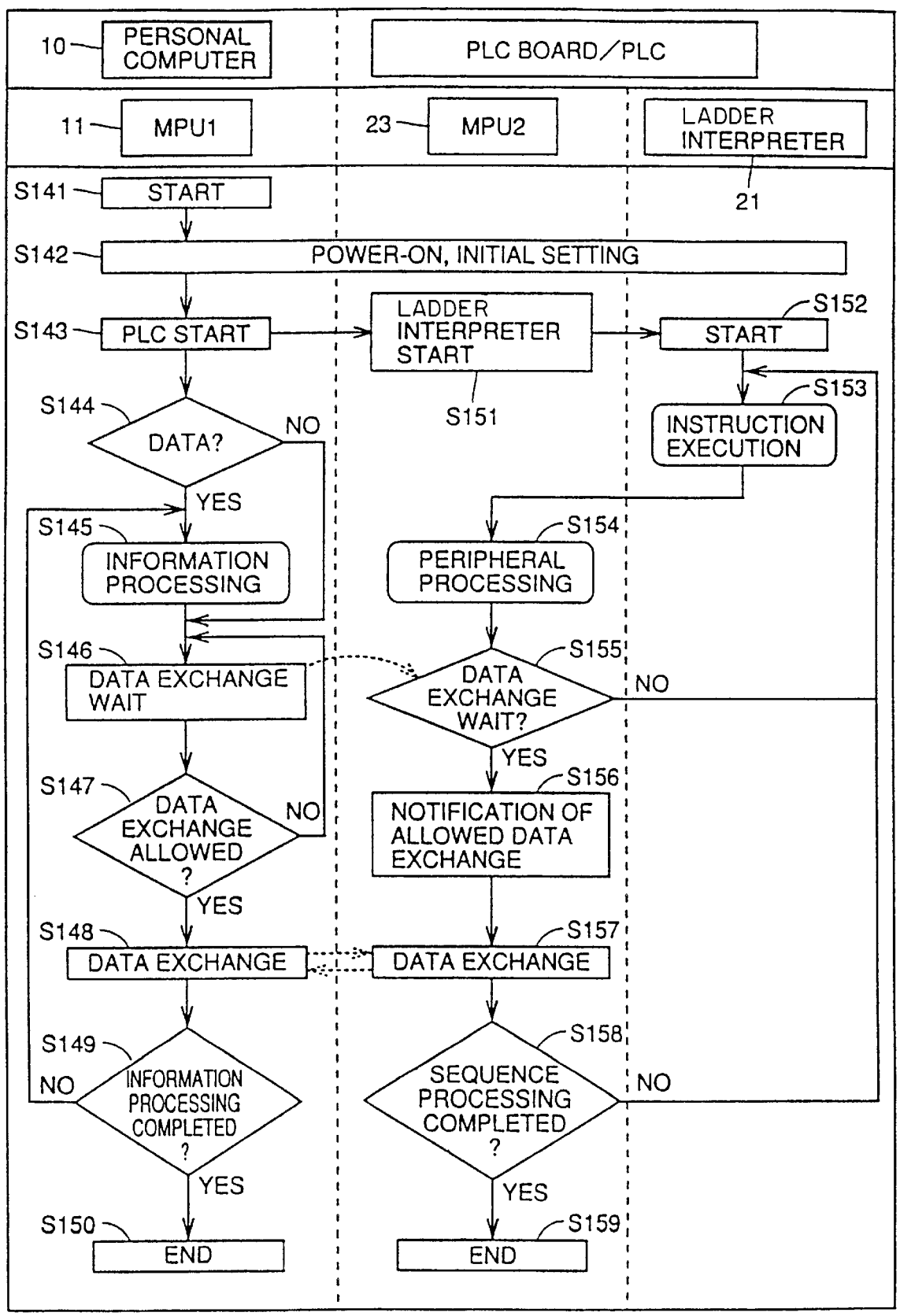
FIG. 21 is a flow chart specifically showing steps of processing in the board PLC and "PLC+personal computer".

FIG. 3 is a flow chart showing steps of the information processing by microprocessor unit (MPU1) 201 of personal computer 200, and corresponding to FIG. 20 already described.

In FIG. 3, when microprocessor unit (MPU1) 201 of personal computer 200 is activated (step S231), it determines whether ladder interpreter 301 of sequence engine 300 has issued the "peripheral processing request" or not (step S232). When it is determined that ladder interpreter 301 of sequence engine 300 has not issued the "peripheral processing request" (NO at step S232), the process returns to step S232. When it is determined that the "peripheral processing request" has been issued (YES at step S232), it is then determined whether "interruption processing" has been performed in microprocessor unit (MPU1) 201 of personal computer 200 or not (step S233). When "interruption processing" has not been performed (NO at step 233), "data exchange" is executed (step S234), and then "information processing" is executed (step S235).

When it is determined that "interruption processing" has been performed (YES at step 233), the process advances to step S235 without performing "data exchange" at step S234, and "information processing" is executed.

Then, it is determined whether this "information processing" is completed or not (step S236). When it is determined that "information processing" is not completed (NO at step S236), it is then determined whether ladder interpreter 301 of sequence engine 300 has issued a "peripheral processing request" or not (step S237). When the "peripheral processing request" has been issued (YES at step 237), "interruption processing" of "information processing" is executed (step S238).

When it is determined, at step 236, that the "information processing" is completed (YES at step 236), the process returns to step S232. When it is determined at step S237 that the "peripheral processing request" has not been issued (NO at step S237), the process returns to step S235.

When "interruption processing" is completed at step S238, it is then determined whether all "information processing" is completed or not (step S239). When it is determined that all "information processing" is not completed (NO at step S239), the process returns to step S232. When it is determined that all "information processing" is completed (YES at step S239), this processing is finished (step S240).

In the software PLC with the sequence engine, since "instruction execution" is performed by the dedicated hardware, i.e., ladder interpreter 301 of sequence engine 300, fast processing is allowed.

Since the process is executed through the steps described above, it includes processing for "start-up of sequence engine 300" and "stop of sequence engine 300" based on the instructions from microprocessor unit (MPU1) 201 of personal computer 200.

The status of execution of the ladder program stored in user memory UM of memory 303 in sequence engine 300 is transferred between microprocessor unit (MPU1) 201 of personal computer 200 and ladder interpreter 301 of sequence engine 300. For this purpose as well as "instruction execution" by ladder interpreter 301, ladder register 302 of sequence engine 300 includes:

(1) a program counter register,
(2) a status register, and
(3) a UM address register.

The "start-up of sequence engine 300" is performed by such an operation that microprocessor unit (MPU1) 201 of personal computer 200 sets the program counter register of register 302 in sequence engine 300 to an initial value, and sets the "start flag" of the status register to the start state.

When the "start flag" of status register is set to the start state, ladder interpreter 301 of sequence engine 300 refers to the initial value set at the program counter register, and starts fetching and decoding of the ladder program stored in user memory UM of memory 303.

The "stop of sequence engine" is performed by setting the "start flag" of status register to the stop state.

When the "start flag" of status register is set to the stop state, ladder interpreter 301 of sequence engine 300 stops its processing, and notifies microprocessor unit (MPU1) 201 of personal computer 200 of this stop in an interrupting manner.

In the program counter register, the initial value is set upon start-up of ladder interpreter 301 of sequence engine 300, and is incremented upon every execution of one instruction in the ladder program stored in user memory UM.

The UM address register stores a leading address (UM leading address) of the ladder program stored in user memory UM of memory 303 for "instruction execution".

For "interruption processing" of "information processing" described above, personal computer 200 in this embodiment includes:

(4) a program counter register for information processing,
(5) a data address register, and
(6) a data size register.

These registers, i.e., (4) the program counter register for information processing,
(5) the data address register, and
(6) the data size register will be described below in detail.

Figure 4:
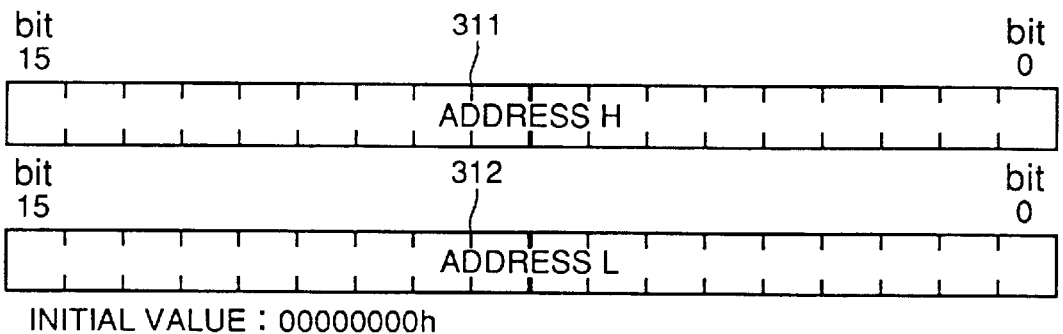
FIG. 4 shows an example of a program counter register for information processing employed in this embodiment.

FIG. 4 shows an example of the program counter register for information processing. The program counter register for information processing is formed of two registers, i.e., a first register 311 of 16 bits and a second register 312 of 16 bits. In the initial setting operation, microprocessor unit (MPU1) 201 of personal computer 200 keeps an area on work memory 202. When interruption of "information processing" occurs, it holds a value of the program counter which manages the information processing program for executing "information processing".

Here, 16 bits from a bit 0 to a bit 15 in first register 311 store an address H, which is a high address in the program counter at the time of occurrence of interruption of "information processing", and 16 bits from a bit 0 to a bit 15 in second register 312 store an address L, which is a low address in the program counter at the time of occurrence of interruption of "information processing". The initial value of this program counter for information processing is set to "00000000h".

Figure 5:
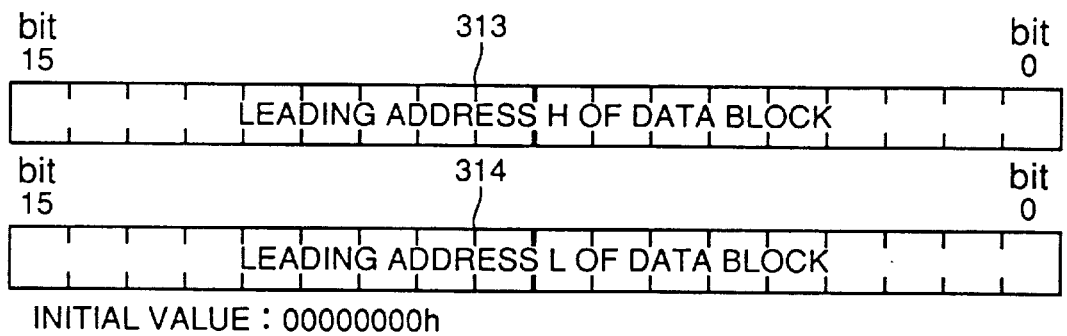
FIG. 5 shows an example of a data address register employed in this embodiment.

FIG. 5 shows an example of the data address register described before. Similarly to the program counter register for information processing, the data address register is formed of two registers, i.e., first register 313 of 16 bits and second register 314 of 16 bits. When setting the initial value, microprocessor unit (MPU1) 201 of personal computer 200 keeps an area for it on work memory area 202. When interruption of "information processing" occurs, it keeps a data block for holding the output of the information processing block already processed, and stores the leading address of this data block.

Here, 16 bits from a bit 0 to a bit 15 in first register 313 store a leading address H of the data block, which is a high address of the leading address of the data block, and 16 bits from a bit 0 to a bit 15 in second register 314 store a leading address L of the data block, which is a low address of the leading address of the data block. The initial value of this data address register is set to "00000000h".

Figure 6:
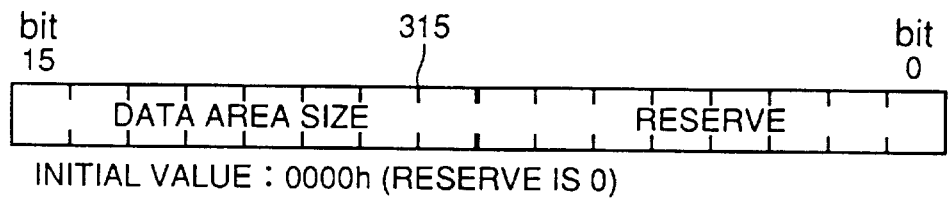
FIG. 6 shows an example of a data address register employed in this embodiment.

FIG. 6 shows an example of the data size register. The data size register is formed of a 16-bit register 315. In the initial setting, microprocessor unit (MPU1) 201 of personal computer 200 keeps an area for it on work memory 202. When interruption of "information processing" occurs, it keeps a data block for holding the output of the information processing block already processed, and stores the size (bytes) of this data block.

In this example, the size (bytes) of the data block is stored on eight bits from a bit 8 to a bit 15 in register 315, and eight bits from a bit 0 to a bit 7 are set to reserve. The reserve of this data size is set to "0", and the initial value is set to "0000h". The size (bytes) of the data block, which is stored in the data size register when interruption of "information processing" does not occur, is "00h".

Description will now be given on specific steps of processing in this embodiment.

Figure 7:
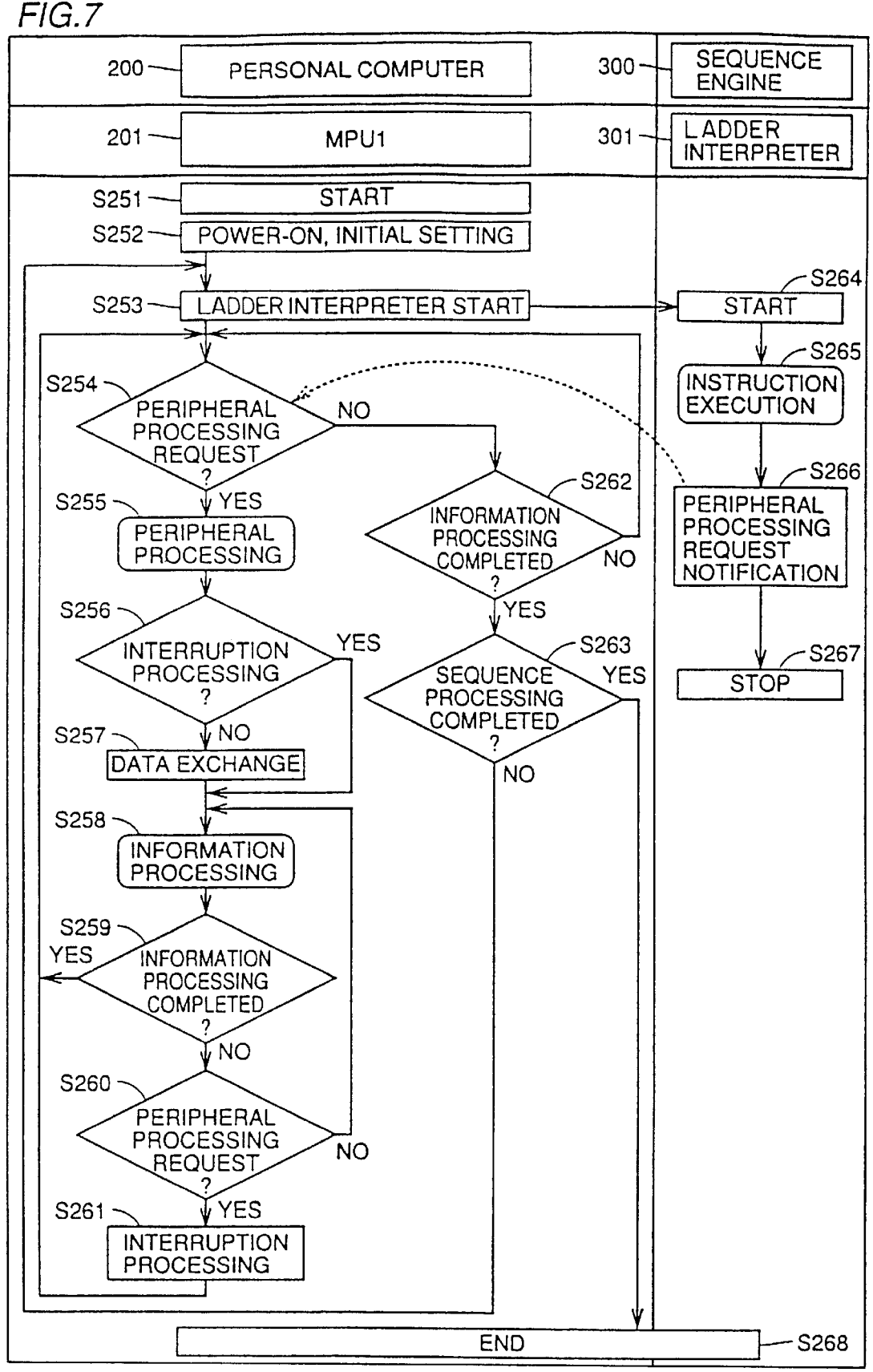
FIG. 7 is a flow chart specifically showing steps of processing by a software PLC according to an embodiment of the invention shown in FIG. 1.

FIG. 7 is a flow chart showing specific steps of the processing in this embodiment. Referring to FIG. 7, power-on and initial setting are first performed (step S252) upon start-up (step S251).

For the initial setting, microprocessor unit (MPU1) 201 of personal computer 200 issues a reset signal to sequence engine 300 for initializing the following units arranged in register 302 of sequence engine 300.

(1) program counter register (2) status register (3) UM address register

Then, microprocessor unit (MPU1) 201 of personal computer 200 keeps, on work memory 202, the areas for the following registers and thereby initializes them.

(4) program counter register for information processing (5) data address register (6) data size register Microprocessor unit (MPU1) 201 of personal computer 200 writes a UM leading address in the UM address register, and subsequently reads it for determining whether the writing in the UM address register was performed successful or not. When the writing in the UM address register was succeeded, this initial setting is finished. If the writing in the UM address register was failed, writing in the UM address register is performed again.

Then, microprocessor unit (MPU1) 201 of personal computer 200 effects start-up processing for ladder interpreter 301 of sequence engine 300 (step S253).

The start-up processing for ladder interpreter 301 of sequence engine 300 is performed by setting an initial value at the program counter register of register 302 in sequence engine 300 and setting the "start flag" of the status register to the start status.

When ladder interpreter 301 of sequence engine 300 starts up (step S264), ladder interpreter 301 performs "instruction execution" by fetching and decoding the ladder program stored in user memory UM of memory 303 (step S265). Results of this execution are written into I/O memory IOM of memory 303, and thereby are reflected on I/O memory IOM.

When one "instruction execution" is finished, ladder interpreter 301 sends a "peripheral processing request notification" requesting "peripheral processing" to microprocessor unit (MPU1) 201 of personal computer 200 (step S266), and thereafter stops (step S267).

When microprocessor unit (MPU1) 201 of personal computer 200 completes the start-up processing for ladder interpreter 301 of sequence engine 300, it determines whether the peripheral processing request issued from ladder interpreter 301 of sequence engine 300 is present or not (step S254). When it is determined that the peripheral processing request issued from ladder interpreter 301 of sequence engine 300 is present (YES at step S254), "peripheral processing" is executed (step S255).

It is then determined whether "interruption processing" was performed at microprocessor unit (MPU1) 201 of personal computer 200 or not (step S256). When "interruption processing" was not performed (NO at step S256), "data exchange" is executed (step S257), and thereafter "information processing" is executed (step S258).

When it is determined that "interruption processing" was performed at step S256 (YES at step S256), the process advances to step S258 without performing "data exchange" at step S257, and "information processing" is executed.

Then, it is determined whether this "information processing" is completed or not (step S259). When it is determined that this "information processing" is not completed (NO at step 259), it is then determined whether ladder interpreter 301 of sequence engine 300 has issued a "peripheral processing request" or not (step S260). When the "peripheral processing request" has been issued (YES at step S260), "interruption processing" for interrupting "information processing" is executed (step S261).

When it is determined that "information processing" is completed at step S259 (YES at step S259), the process returns to step S254. When it is determined at step S260 that "peripheral processing request" has not been issued (NO at step S260), the process returns to step S258.

When it is determined at step S254 that the "peripheral processing request" has not been issued (NO at step S254), it is determined whether all "peripheral processing" is completed or not (step S262). When it is determined that all "information processing" is not completed (NO at step S262), the process returns to step S254. When it is determined that all "information processing" is completed (YES at step S262), it is them determined whether all "sequence processing" is completed or not (step S263). When all "sequence processing" is not completed (NO at step S263), the process returns to step S253. When all "sequence processing" is completed (YES at step S263), this process is finished (step S268).

In this embodiment, a predetermined information processing program executed by microprocessor unit (MPU1) 201 of personal computer 200 is formed of a plurality of blocks, and the microprocessor unit (MPU1) 201 of personal computer 200 is adapted to interrupt "information processing" at boundaries between these blocks. In order to restart the interrupted "information processing", it is necessary to save the results of processing of the information processing blocks which have already been processed.

More specifically, in order to restart the interrupted "information processing", the results of processing of Nth information processing block already processed will form an input of (N+1)th information processing block.

In this embodiment, it is determined, upon every completion of the information processing block, whether a "peripheral processing request" from sequence engine 300 is present or not, and "information processing" is interrupted in accordance with the following steps when the "peripheral processing request" is present.

(1) A program counter value is stored in the program counter register for information processing.

(2) An area corresponding to an amount of data output by "information processing" is kept on work memory 202 of personal computer 200.

(3) A leading address of the data block is stored in the data address register.

(4) A size of the data block is stored in the data size register.

When conditions for enabling execution of "information processing" are satisfied, "information processing" are restarted in accordance with the following steps.

(1) A value stored in the program counter register for information processing is read out, and is written into the program counter.

(2) The leading address of the data program stored in the data register is read out.

(3) Data of only the data block size stored in the data size register and starting from the leading address of the data block read at (2) is fetched and input.

In the above structure, presence or absence of "interruption processing" can be determined based on a value stored in "data size register". This is because of the following fact. As described before, when interruption of "information processing" occurred, a size of the data block is stored in the "data size register". Alternatively, the value stored in the "data size register" is "000h" when interruption of "information processing" did not occur.

(2) Second Embodiment

Figure 8:
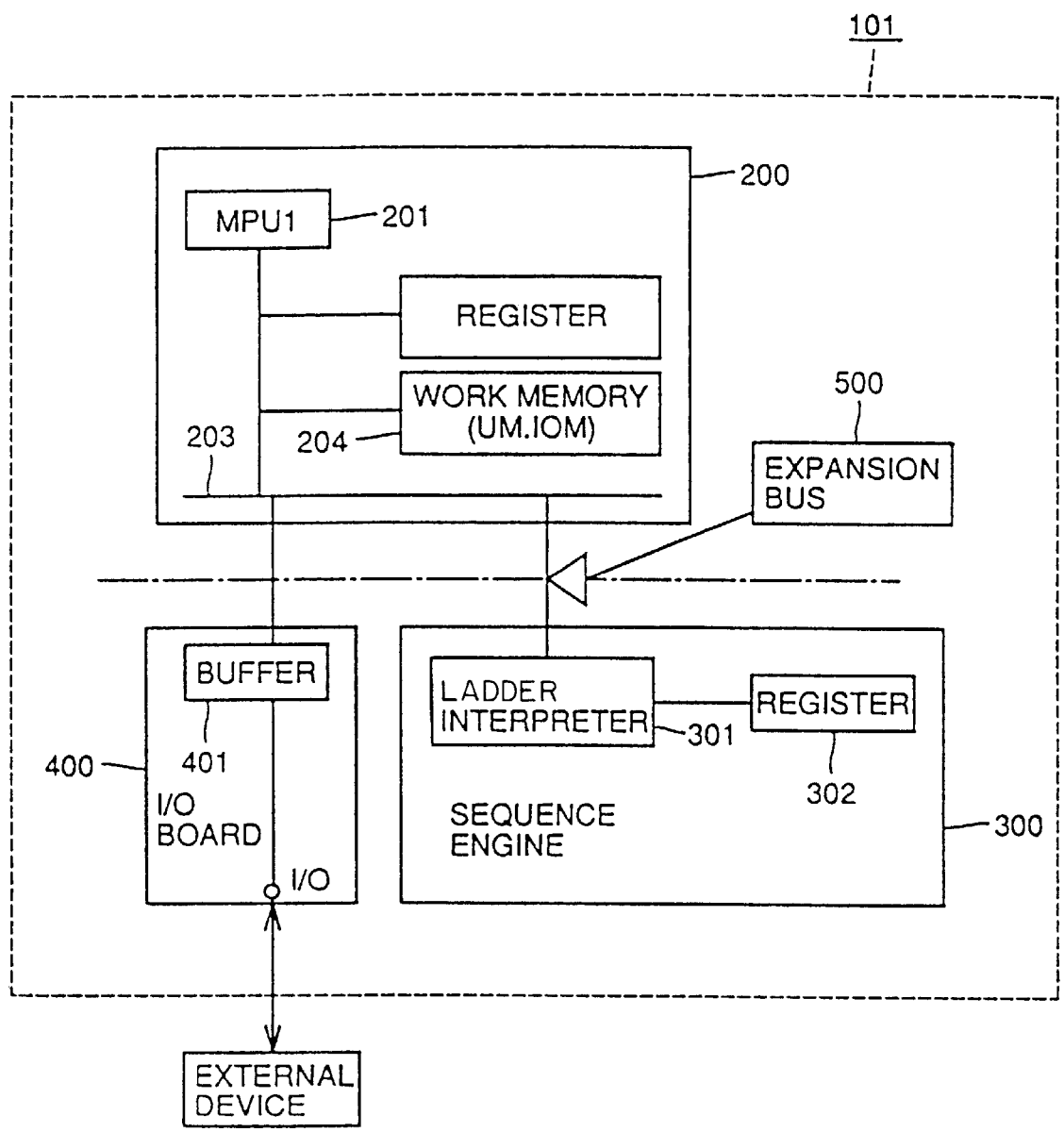
FIG. 8 is a block diagram showing a schematic structure of the software PLC with sequence engine employing an information processing device of a second embodiment of the invention.

FIG. 8 is a block diagram showing a schematic structure of a software PLC 101 with a sequence engine, which employs a device and a method for sequence control according to a second embodiment.

In FIG. 8, software PLC 101 with the sequence engine has a structure similar to that of the first embodiment, and therefore has such a structure that sequence engine 300 is connected to internal bus 203 of general-purpose personal computer 200 via personal computer expansion bus 500, and I/O board 400 is also connected thereto. The same elements and components as those in the first embodiment bear the same reference characters.

Personal computer 200 includes microprocessor unit (MPU1) 201 and work memory 204, which is provided with a user memory UM storing a user program, i.e., ladder program and an I/O memory IOM storing input/output information.

Sequence engine 300 includes ladder interpreter 301 for interpreting and executing the ladder program stored in user memory UM, and register 302 for managing and storing a status of execution of the ladder program by ladder interpreter 301.

Since ladder interpreter 301 has a function as a bus controller, microprocessor unit (MPU1) 201 of personal computer 200 can access register 302 of sequence engine 300 through personal computer expansion bus 500, and ladder interpreter 301 can access work memory 202 of personal computer 200 through personal computer expansion bus 500.

I/O board 400 includes a buffer 401 which temporarily stores information sent into and from an I/O port.

As already described, processing of the PLC can be basically classified into "instruction execution" for interpreting and executing the ladder program and "peripheral processing" for input refreshing (IN-refreshing) and output refreshing (OUT-refreshing) of the I/O port.

In software PLC 101 with the sequence engine shown in FIG. 8 of this embodiment, the "instruction execution" is performed by fetching and decoding the ladder program stored in user memory UM of work memory 204 in personal computer 200, and results of this "instruction execution" are reflected on I/O memory IOM of work memory 204 of personal computer 200.

According to this structure, since "instruction execution" is performed by the dedicated hardware, i.e., ladder interpreter 301 of sequence engine 300, fast processing is allowed compared with the software PLC shown in FIG. 16.

Figure 9:
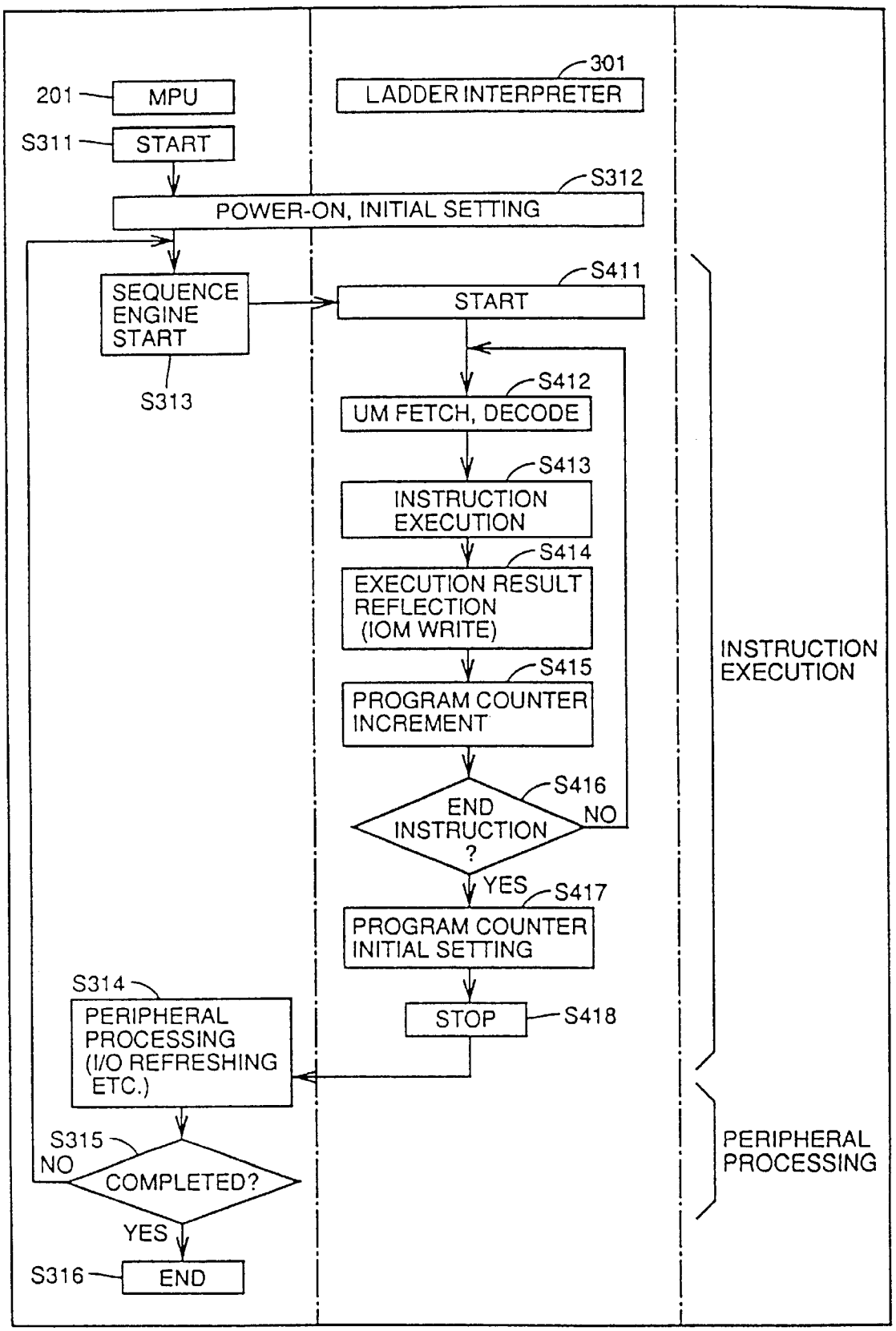
FIG. 9 is a flow chart showing steps of processing in the software PLC with the sequence engine of the second embodiment.

FIG. 9 is a flow chart showing steps of processing in software PLC 101 with the sequence engine shown in FIG. 8. In the flow chart shown in FIG. 9, power-on and initial setting of microprocessor unit (MPU1) 201 of personal computer 200 and ladder interpreter 301 of sequence engine 300 are first performed (step S312) upon start-up (step S311).

Microprocessor unit (MPU1) 201 of personal computer 200 instructs start-up of ladder interpreter 301 of sequence engine 300 (step S313).

Rudder interpreter 301 of sequence engine 300 starts up in response to a start-up instruction sent from microprocessor unit (MPU1) 201 of personal computer 200 (step S411), and first operates to fetch and decode the ladder program stored in user memory UM of work memory 204 in personal computer 200 (step S412). Thereby, "instruction execution" is performed based on the ladder program (step S413).

Thereafter, the program counter provided at register 302 of sequence engine 300 is incremented (step S415), and then it is determined whether an end instruction issued from microprocessor unit (MPU1) 201 of personal computer 200 is present or not (step S416). When it is determined that the end instruction is not present (NO at step S416), the process returns to step S412, and the processing from step S412 to step S416 is repeated.

When it is determined, at step S416, that microprocessor unit (MPU1) 201 of personal computer 200 has issued the end instruction (YES at step S416), the program counter provided at register 302 of sequence engine 300 is initialized (step S417), and processing by ladder interpreter 301 of sequence engine 300 stops (step S418).

When ladder interpreter 301 of sequence engine 300 stops its processing, microprocessor unit (MPU1) 201 of personal computer 200 executes peripheral processing such as I/O refreshing (step S314).

Then, it is determined whether the ladder program stored in user memory UM of work memory 204 in personal computer 200 has been completely executed (step S315). When it is determined that the ladder program has not been completely executed (NO at step S315), the process returns to step S313. When it is determined that the ladder program has been completely executed (YES at step S315), this process is finished (step S316).

Thus, in this software PLC 101 with the sequence engine, ladder interpreter 301 of sequence engine 300 performs "instruction execution" and more specifically, executes the user program by fetching and decoding the ladder program stored in user memory UM of work memory 204 in personal computer 200, and microprocessor unit (MPU1) 201 of personal computer 200 executes "peripheral processing" such as input refreshing (IN-refreshing) and output refreshing (OUT-refreshing) of the I/O port.

Thus, in this software PLC with the sequence engine, "instruction execution" is performed by the dedicated hardware, i.e., ladder interpreter 301 of sequence engine 300, as is done in the first embodiment. Therefore, fast processing is allowed.

For the above steps of processing, the process includes processing of "start-up of sequence engine 300" and. "stop of sequence engine 300" based on the instructions from microprocessor unit (MPU1) 201 of personal computer 200, and, for "instruction execution" by ladder interpreter 301, register 302 of sequence engine 300 is provided with the program counter register, status register and UM address register.

Operations such as "start-up of sequence engine 300" is similar to those in the first embodiment, and therefore will not be described below.

Description will be given on details of the following registers, which form register 302 of sequence engine 300 and are already described in connection with the first embodiment.

(1) program counter register
(2) status register
(3) UM address register

Figure 10:
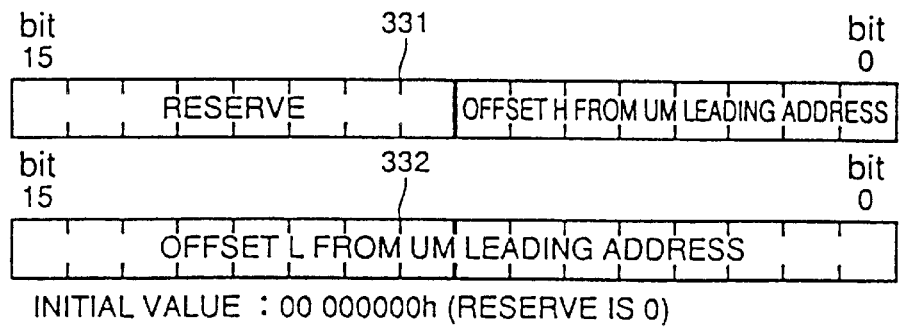
FIG. 10 shows an example of a program counter register forming a register of the sequence engine in the second embodiment.

FIG. 10 shows an example of the program counter register forming register 302 of sequence engine 300.

The program counter register forming register 302 of sequence engine 300 is formed of two registers, i.e., a first register 331 of 16 bits and a second register 332 of 16 bits.

In this program counter register, its initial value is set upon start-up of ladder interpreter 301 of sequence engine 300, and its count value is incremented upon every execution of one instruction of the ladder program stored in user memory UM of work memory 202 in personal computer 200.

In eight bits from a bit 0 to a bit 7 in first register 331, there is stored an offset (H) from a UM leading address, i.e., higher eight bits of the offset value (offset from the UM leading address) from the leading address of the ladder program stored in user memory UM for "instruction execution". In 16 bits from a bit 0 to a bit 15 in second register 332, there is stored an offset (L) from the UM leading address, i.e., lower 16 bits of the offset from the UM leading address. Eight bits from a bit 8 to a bit 15 in first register 331 are set to reserve.

The reserve of this program counter register is set to "0", and the initial value is set to "00000000h".

Figure 11:
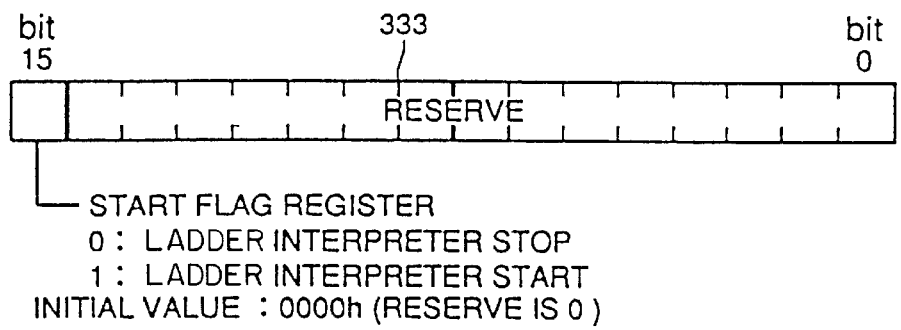
FIG. 11 shows an example of a status register forming the register of the sequence engine in the second embodiment.

FIG. 11 shows an example of the status register forming register 302 of sequence engine 300.

The status register forming register 302 of sequence engine 300 is formed of one 16-bit register 333. One bit, i.e., bit 15 of register 333 functions as a start flag register storing the start flag. Fifteen bits from a bit 0 to a bit 14 in register 333 are set to reserve. Reserve of this status register is set to "0", and its initial value is set to "0000h".

When the start flag at bit 15 in the status register is "0", ladder interpreter 301 of sequence engine 300 stops. When the start flag at bit 15 in the status register is "1", ladder interpreter 301 of sequence engine 300 starts up.

Figure 12:
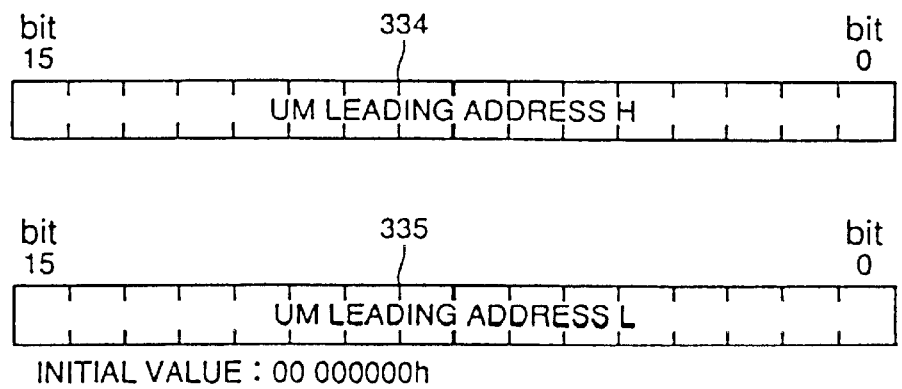
FIG. 12 shows an example of an UM address register forming the register of the sequence engine in the second embodiment.

FIG. 12 shows an example of the UM address register forming register 302 of sequence engine 300.

The UM address register forming register 302 of sequence engine 300 is formed of two registers, i.e., a first register 334 of 16 bits and a second register 335 of 16 bits, and stores the leading address (UM leading address) of the ladder program stored in user memory UM for "instruction execution".

Here, 16 bits from a bit 0 to a bit 15 in first register 334 store a UM leading address H, i.e., higher 16 bits of the UM leading address, and 16 bits from a bit 0 to a bit 15 in second register 335 store a UM leading address L, i.e., lower 16 bits of the UM leading address.

The initial value of this UM address register is set to "00000000h", and this initial value is set by microprocessor unit (MPU1) 201 of personal computer 200 in the initial setting operation of this system.

In the above embodiment, "instruction execution" is performed by ladder interpreter 301 of sequence engine 300. However, "instruction execution" performed by ladder interpreter 301 of sequence engine 300 may be supported by microprocessor unit (MPU1) 201 of personal computer 200.

Figure 13:
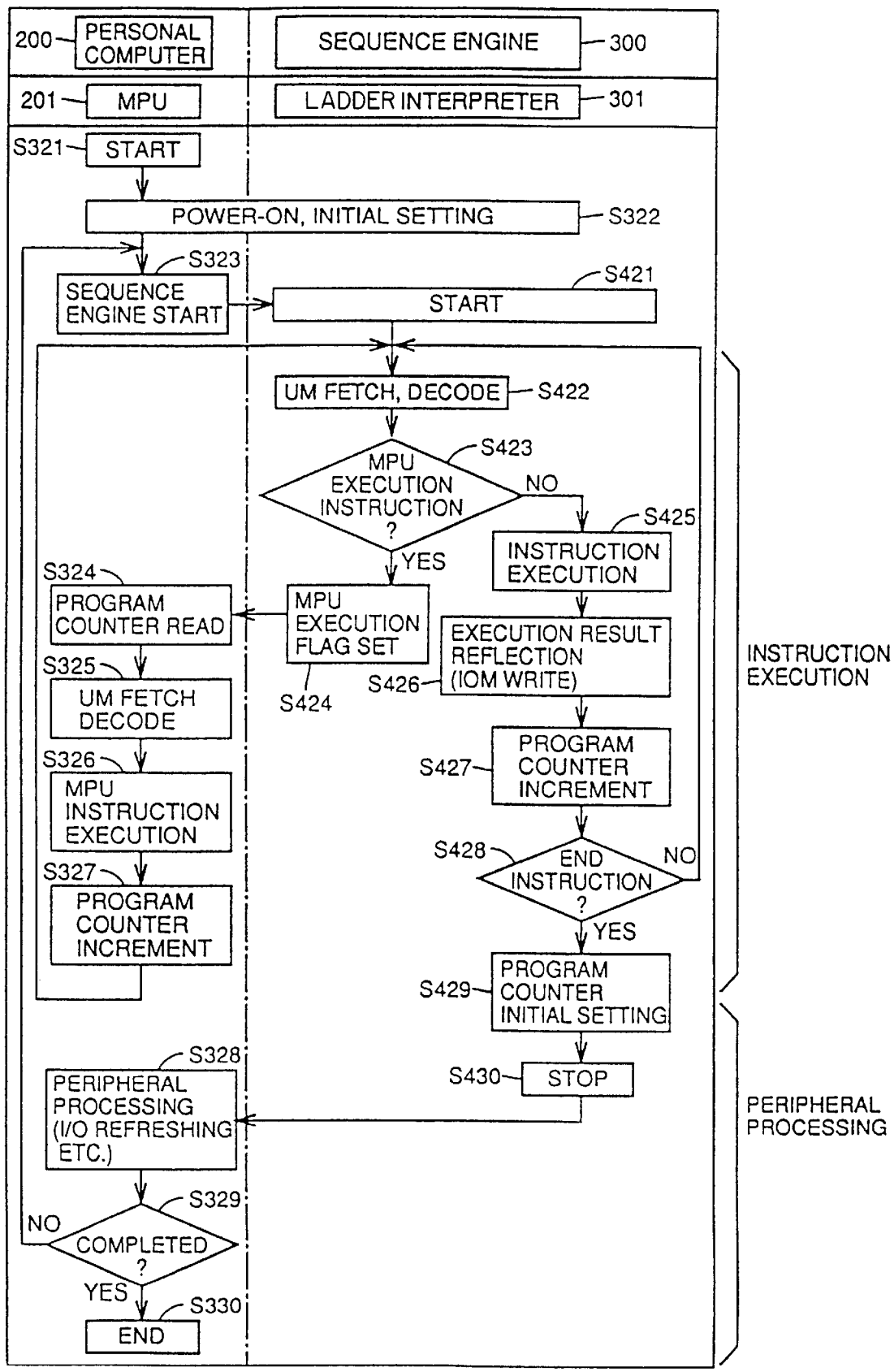
FIG. 13 is a flow chart showing steps of processing of another embodiment of the invention, in which a microprocessor unit of a personal computer supports instruction execution performed by a ladder interpreter of the sequence engine in the second embodiment.

FIG. 13 shows a modification of the second embodiment of the invention, in which "instruction execution" performed by ladder interpreter 301 of sequence engine 300 is supported by microprocessor unit (MPU1) 201 of personal computer 200. The hardware structure in this modification may be the same as that shown in FIG. 8.

In the structure shown in FIG. 13, when microprocessor unit (MPU1) 201 of personal computer 200 operates instead of ladder interpreter 301 of sequence engine 300 to perform "instruction execution" to be performed by ladder interpreter 301 of sequence engine 300, microprocessor unit (MPU1) 201 of personal computer 200 sends an "MPU execution instruction" to ladder interpreter 301 of sequence engine 300. In this case, ladder interpreter 301 of sequence engine 300 requests microprocessor unit (MPU1) 201 of personal computer 200 to perform "instruction execution" related to this "MPU execution instruction".

In the flow chart shown in FIG. 13, power-on and initial setting of microprocessor unit (MPU1) 201 of personal computer 200 and ladder interpreter 301 of sequence engine 300 are first performed (step S322) upon start-up of microprocessor unit (MPU1) 201 of personal computer 200 (step S321).

Microprocessor unit (MPU1) 201 of personal computer 200 instructs start-up of ladder interpreter 301 of sequence engine 300 (step S323).

Ladder interpreter 301 of sequence engine 300 starts up in response to start instruction issued from microprocessor unit (MPU1) 201 of personal computer 200 (step S421), and first fetches and decodes the ladder program stored in user memory UM of work memory 204 in personal computer 200 (step 422).

In connection with "instruction execution" of the ladder program thus fetched and decoded, it is determined whether or not microprocessor unit (MPU1) 201 of personal computer 200 has sent an "MPU execution instruction" to ladder interpreter 301 of sequence engine 300 (step S423). When the "MPU execution instruction" is sent (YES at step S423), an "MPU execution flag" is set (step S424), and this "instruction execution" is requested to microprocessor unit (MPU1) 201 of personal computer 200.

When this "instruction execution" is requested, microprocessor unit (MPU1) 201 of personal computer 200 reads the program counter register forming register 302 of sequence engine 300 (step S324), and then executes the "MPU execution instruction" (step S326) by fetching and decoding the ladder program stored in user memory UM of work memory 204 in personal computer 200 (step S325). Thereafter, the program counter provided at register 302 of sequence engine 300 is incremented (step S327), and the process returns to step S422.

When it is determined that the "MPU execution instruction" is not issued at step S423 (NO at step S423), "instruction execution" is performed at step S425 based on the ladder program fetched and decoded at step S422.

By writing results of the execution into I/O memory IOM, the results of execution are reflected on I/O memory IOM (step S426).

Thereafter, the program counter provided at register 302 of sequence engine 300 is incremented (step S427), and then it is determined whether microprocessor unit (MPU1) 201 of personal computer 200 has issued an end instruction or not (step S428). When it is determined that the end instruction is not issued (NO at step S428), the process returns to step S422, and the processing starting from step S422 is repeated.

When it is determined, at step S428, that microprocessor unit (MPU1) 201 of personal computer 200 has issued the end instruction (YES at step S428), the program counter provided at register 302 in sequence engine 300 is initialized (step S429), and ladder interpreter 301 of sequence engine 300 stops the processing (step S430).

When ladder interpreter 301 of sequence engine 300 stops the processing, microprocessor unit (MPU1) 201 of personal computer 200 executes peripheral processing such as I/O refreshing (step S328).

Then, it is determined whether the ladder program stored in user memory UM of work memory 202 in personal computer 200 is fully completed or not (step S329). When it is determined that the ladder program is not fully completed (NO at step S329), the process returns to step S323. When it is determined that the ladder program is fully completed (YES at step S329), this processing is finished.

In the modification of the second embodiment of the invention, ladder interpreter 301 of sequence engine 300 performs "instruction execution", i.e., execution of the user program by fetching and decoding the ladder program stored in user memory UM of work memory 204 in personal computer 200. When it receives "MPU execution instruction" from microprocessor unit (MPU1) 201 of personal computer 200, ladder interpreter 301 of sequence engine 300 requests microprocessor unit (MPU1) 201 of personal computer 200 to perform "instruction execution" related to this "MPU execution instruction", and thereby microprocessor unit (MPU1) 201 of personal computer 200 can support "instruction execution" performed by ladder interpreter 301 of sequence engine 300.

Figure 14:
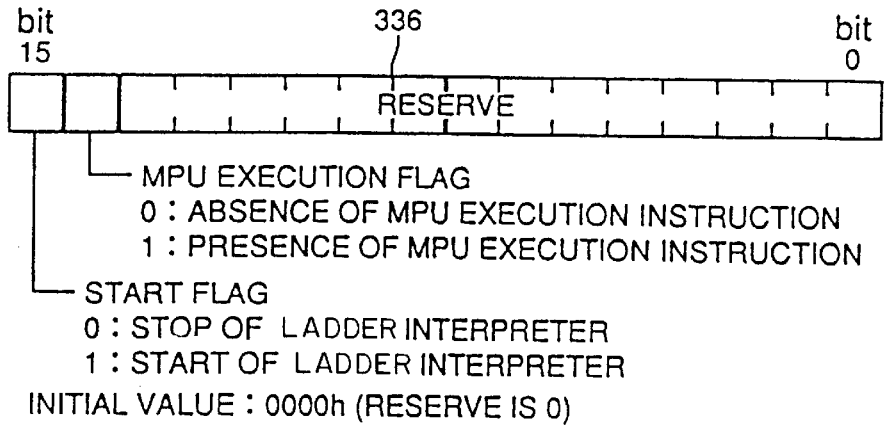
FIG. 14 shows another example of a status register in the embodiment of the invention shown in FIG. 13.

FIG. 14 shows an example of the status register forming register 302 of sequence engine 300 in the structure described above.

In this case, the status register forming register 302 of sequence engine 300 functions as a start flag register storing the start flag and an MPU execution flag register storing the MPU execution flag.

In this case, the status register forming register 302 of sequence engine 300 is formed of one 16-bit register 336 as shown in FIG. 14. One bit, i.e., a bit 15 in register 336 functions as a start flag register storing the start flag, and one bit, i.e., a bit 14 functions as an MPU execution flag register storing the MPU execution flag. Fourteen bits from a bit 0 to a bit 13 in register 336 are set to reserve. The reserve of the status register is set to "0", and the initial value is set to "0000h".

The forms of processing by ladder interpreter 301 of sequence engine 300 and microprocessor unit (MPU1) 201 of personal computer 200 are controlled based on the start flag stored in the bit 15 of the status register and the MPU execution flag stored in the bit 14.

Figure 15:
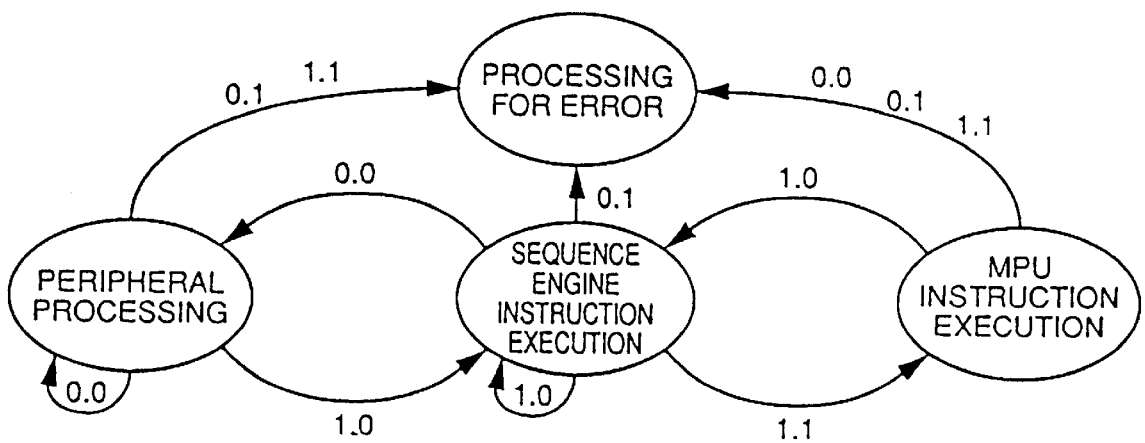
FIG. 15 shows transition of processing based on a start flag and an MPU execution flag in the embodiment shown in FIG. 13.

FIG. 15 is a status transition diagram showing transition of processing based on the start flag and MPU execution flag in this modification.

In FIG. 15, a set of two numerals is added to each transition. The numeral at a high place represents the start flag, and the numeral at a low place represents the MPU execution flag.

In FIG. 15, when the start flag is "1" and the MPU flag is "0", "instruction execution" by ladder interpreter 301 of sequence engine 300 performs "instruction execution". When the start flag goes to "0" in this state, and in other words, when the start flag goes to "0" and the MPU execution flag goes to "0", the process transfers to "peripheral processing" by microprocessor unit (MPU1) 201 of personal computer 200.

The start flag may go to "1" while microprocessor unit (MPU1) 201 of personal computer 200 is performing "peripheral processing", and in other words, while the start flag is "0" and the MPU execution flag is "0". In other words, the start flag and MPU execution flag may go to "1" and "0", respectively. In this case, the process transfers to "instruction execution" by ladder interpreter 301 of sequence engine 300.

The MPU execution flag may go to "1" while microprocessor unit (MPU1) 201 of personal computer 200 is performing "peripheral processing", and in other words, when both the start flag and MPU execution flag are "0". In other words, the start flag and MPU execution flag may go to "0" and "1", respectively. Also, both the start flag and MPU execution flag may go to "1". Thus, the start flag may go to "1", and the MPU execution flag may go to "1". In these cases, the status is determined as an error, and the process transfers to processing for an error.

The MPU execution flag may go to "1" while ladder interpreter 301 of sequence engine 300 is performing "instruction execution", and in other words, when the start flag and MPU execution flag are "1" and "0", respectively. In this case, the process transfers to "MPU execution instruction" by microprocessor unit (MPU1) 201 of personal computer 200.

The MPU execution flag may go to "0" while microprocessor unit (MPU1) 201 of personal computer 200 is performing "MPU execution instruction", and in other words, when both the start flag and MPU execution flag are "1". In this case, i.e., when the start flag and MPU execution flag go to "1" and "0", respectively, the process transfers to "instruction execution" by ladder interpreter 301 of sequence engine 300.

The MPU execution flag may go to "1" while microprocessor unit (MPU1) 201 of personal computer 200 is performing "MPU execution instruction", and in other words, when both the start flag and MPU execution flag are "1". In this case, i.e., when both the start flag and MPU execution flag go to "1", and in such cases that the start flag goes to "0" and the MPU execution flag goes to "1", and that both the start flag and MPU execution flag go to "0", i.e., that the start flag goes to "0" and the MPU execution flag go to "0", the status is determined as an error, and the process transfers to processing for an error.

The start flag and MPU execution flag may go to "0" and "1", respectively, while ladder interpreter 301 of sequence engine 300 is performing "instruction execution", i.e., when the start flag is "1" and the MPU execution flag is "0". In this case, the status is likewise determined as an error, and the process transfers to processing for an error.

INDUSTRIAL APPLICABILITY

According to the information processing device of the invention, as described above, a sequence instruction executing unit is connected to a data processing device through a bus, the sequence instruction executing unit executes a sequence instruction based on a predetermined sequence program in response to an instruction issued from the data processing device, and the data processing device performs information processing based on a predetermined information processing program and executes peripheral processing in accordance with a peripheral processing request issued from a sequence instruction execution unit. Therefore, the whole system can be inexpensive, and an influence exerted on a cycle of the sequence processing can be minimized, which is suitable to information processing.

We claim:

1. A sequence control device comprising a data processing device provided with a processor and an internal bus connected to said processor, and sequence instruction execution means connected to said internal bus, wherein said data processing device or said sequence instruction execution means includes a user memory for storing a sequence program prepared by a user and an I/O memory for storing a status of input/output, and an I/O board connected to an external device controlled by an instruction of said sequence program that is connected independently of said sequence instruction execution means to said internal bus.

2. A sequence control device comprising a data processing device provided with a processor and an internal bus connected to said processor, and sequence instruction execution means connected to said internal bus, wherein said data processing device or said sequence instruction execution means includes a user memory for storing a sequence program prepared by a user and an I/O memory for storing a state of input/output, an I/O board having memory means and connected to an external device is connected independently of said sequence instruction execution means to said internal bus, and said data processing device includes processing execution means for executing predetermined peripheral processing after interpretation and execution of an instruction in said user memory by said sequence instruction execution means.

3. The sequence control device according to claim 2, wherein said processing execution means includes:
information processing execution means for executing information processing based on a predetermined information processing program,
processing interruption control means for controlling interruption of the information processing executed by said information processing execution means,
determining means for determining presence or absence of a peripheral processing request issued from said sequence instruction execution means upon interruption of the information processing by said processing interruption control means,
peripheral processing execution means for executing said peripheral processing when said determining means determines the presence of the peripheral processing request issued from said sequence instruction execution means, and
processing restart control means for controlling restart of the information processing interrupted by said processing interruption control means.

4. The sequence control device according to claim 3, wherein said information processing program is formed of a plurality of blocks, and
said information processing execution means executes the information processing a block at a time.

5. The sequence control device according to claim 4, wherein said determining means determines the presence or absence of the peripheral processing request issued from said sequence instruction execution means upon every completion of said information processing performed a block at a time.

6. The sequence control device according to claim 2, wherein said sequence program is formed of a ladder program, and
said sequence instruction execution means includes a ladder interpreter performing instruction execution processing by interpreting and executing said ladder program.

7. The sequence control device according to claim 6, wherein said sequence instruction execution means includes register means for managing the instruction execution processing by said ladder interpreter.

8. The sequence control device according to claim 7, wherein said register means includes:
a program counter register having a value to be initially set upon start-up of said ladder interpreter and incremented upon every execution of one instruction of said ladder program,
a status register storing a status of execution of the ladder program by said ladder interpreter, and
an address register storing a leading address of the ladder program executed by said ladder interpreter.

9. The sequence control device according to claim 8, wherein said status register stores a start flag indicating start and stop of said ladder interpreter.

10. The sequence control device according to claim 9, wherein said ladder interpreter performs said instruction execution processing based on the leading address stored in said address register when said start flag indicates start-up of said ladder interpreter, and requests said data processing device to perform said peripheral processing when said start flag indicates stop of said ladder interpreter.

11. The sequence control device according to claim 9, wherein said start flag is written into said status register based on an instruction issued from said data processing device.

12. The sequence control device according to claim 2, further comprising:

sequence program execution support means for executing a sequence program stored in said user memory instead of said sequence instruction execution means.

13. The sequence control device according to claim 8, wherein said status register stores a first flag indicating start and stop of said ladder interpreter, and a second flag indicating whether said instruction execution processing by said ladder interpreter is to be requested to said data processing device or not.

14. The sequence control device according to claim 13, wherein said ladder interpreter executes said instruction execution processing based on the leading address stored in said address register, when said first flag indicates start-up of said ladder interpreter and said second flag does not indicate a request to said data processing device for said instruction execution processing; requests said data processing device to perform said instruction execution processing when said first flag indicates start-up of said ladder interpreter and said second flag indicates a request to said data processing device for said instruction execution processing; and requests said data processing device to perform peripheral processing such as refreshing of the I/O port when said start flag indicates stop of said ladder interpreter and said second flag does not indicate a request to said data processing device for said instruction execution processing.

15. The sequence control device according to claim 13, wherein a process is determined as an error and processing for an error is executed in such a case, during said instruction execution processing by said ladder interpreter, that said first flag indicates stop of said ladder interpreter and said second flag indicates a request to said data processing device for said instruction execution processing; in such cases, during said instruction execution processing by said data processing device, that said first flag indicates start-up of said ladder interpreter and said second flag indicates a request to said data processing device for said instruction execution processing, that said first flag indicates stop of said ladder interpreter and said second flag indicates a request to said data processing device for said instruction execution processing, and that said start flag indicates stop of said ladder interpreter and said second flag does not indicate a request to said data processing device for said instruction execution processing; and in such cases, during said peripheral processing by said data processing device, that said first flag indicates start-up of said ladder interpreter and said second flag indicates a request to said data processing device for said instruction execution processing, and that said first flag indicates stop of said ladder interpreter and said second flag indicates a request to said data processing device for said instruction execution processing.

16. The sequence control device according to claim 13, wherein said first and second flags are written into said status register based on an instruction issued from said data processing device.

17. A sequence control method comprising the step of:

connecting a sequence instruction execution unit to a data processing device through a bus, wherein said sequence instruction execution unit executes a sequence instruction based on a predetermined sequence program in response to an instruction issued from said data processing device, and said data processing device performs information processing based on a predetermined information processing program, and executes peripheral processing in accordance with a peripheral processing request issued from said sequence instruction execution unit.

18. The sequence control method according to claim 17, wherein said data processing device:

determines presence or absence of the peripheral processing request issued from said sequence instruction execution unit during information processing based on a predetermined information processing program, interrupts said information processing to execute the peripheral processing when it is determined that the peripheral processing request issued from said sequence instruction execution unit is present, and restarts said information processing after completion of said peripheral processing.

19. The sequence control method according to claim 17, wherein said information processing program is formed of a plurality of blocks, said data processing device determines presence or absence of the peripheral processing request issued from said sequence instruction execution unit upon every completion of information processing performed a block at a time, said information processing is interrupted and said peripheral processing is executed when it is determined that the peripheral processing request issued from said sequence instruction execution unit is present, and said information processing is restarted after completion of said peripheral processing.

20. The sequence control method according to claim 19, wherein internal contents of the interrupted information processing are saved upon interruption of said information processing, and restart of said information processing is performed based on the saved internal contents of said information processing.

21. The sequence control method according to claim 17, wherein said sequence program is formed of a ladder program, and said sequence instruction execution unit executes said ladder program by interpreting said ladder program.

22. A sequence control method comprising the steps of:

connecting a sequence instruction execution unit to a data processing device through a bus, and storing a sequence program in said data processing device, wherein said sequence instruction execution unit executes said sequence program by accessing through said bus said sequence program stored in said data processing device based on an instruction issued from said data processing device.

23. A sequence control method comprising the steps of:

connecting sequence instruction execution unit to a data processing device through a bus, and storing a sequence program in said data processing device, wherein said sequence instruction execution unit either executes said sequence program by accessing, through said bus, said sequence program stored in said data processing device based on an instruction issued from said data processing device, or said sequence instruction execution unit requests said data processing device to execute said sequence program in accordance with an instruction issued from said data processing device, and restarts execution by said sequence execution instruction unit when the requested execution of said sequence program by said data processing device is completed.

24. The sequence control method according to claim 22, wherein said sequence instruction execution unit finishes execution of said sequence program, and requests said data processing device to execute a peripheral processing in accordance with an instruction issued from said data processing device.

25. The sequence control method according to claim 22, wherein said sequence instruction execution unit is provided with a register for managing execution of said sequence program, a start flag indicating start and stop of said sequence instruction execution unit is written into said register in accordance with an instruction issued from said data processing device, and start and stop of said data processing device are controlled with reference to said written start flag.

26. The sequence control method according to claim 22, wherein said sequence instruction execution unit is provided with a register for managing execution of said sequence program, a start flag indicating start and stop of said sequence instruction execution unit and a second flag indicating whether said data processing device is to be requested to perform the instruction execution processing to be performed by said sequence instruction execution unit are written into said register in accordance with an instruction issued from said data processing device, and start and stop of said data processing device and requests to said data processing device for the instruction execution processing and the peripheral processing are controlled with reference to said written first and second flags.

27. A sequence engine comprising:

a ladder interpreter connected to an internal bus of a data processing device, and started up by said data processing device for executing a ladder instruction by interpreting said ladder instruction; and a register for managing and storing a status of execution of a ladder program by said ladder interpreter, wherein said sequence engine does not have a function of executing peripheral processing.

28. A storage medium applied to an sequence control device, wherein said sequence control device includes:
- a data processing device having a processor and an internal bus connected to said processor,
- a sequence instruction execution unit connected to said internal bus,
- a user memory for storing a sequence program and an I/O memory for storing a status of input/output, said user memory and said I/O memory being provided at said data processing device or said sequence instruction execution unit, and
- an I/O board connected to an external device controlled by an instruction of said sequence program, and connected independently of said sequence instruction execution unit to said internal bus; and wherein said storage medium stores a program for executing peripheral processing by said data processing device, said peripheral processing including I/O refreshing performed by storing data supplied from said external device and stored in a storage unit of said I/O board in said I/O memory after interpretation and execution of the instruction in said user memory by said sequence instruction execution unit, and by outputting the data in said I/O memory to said external device through said I/O board.

* * * * *